(12) United States Patent
Rajadurai

(10) Patent No.: US 10,531,298 B2
(45) Date of Patent: Jan. 7, 2020

(54) MUTUAL AUTHENTICATION BETWEEN USER EQUIPMENT AND AN EVOLVED PACKET CORE

(71) Applicant: Samsung Electronics Co., Ltd., Gyeonggi-do (KR)

(72) Inventor: Rajavelsamy Rajadurai, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/210,721

(22) Filed: Dec. 5, 2018

(65) Prior Publication Data

US 2019/0110203 A1 Apr. 11, 2019

Related U.S. Application Data

(63) Continuation of application No. 14/992,654, filed on Jan. 11, 2016, now Pat. No. 10,187,795.

(30) Foreign Application Priority Data

Jan. 9, 2015 (IN) .................. 160/CHE/2015 PS
Dec. 31, 2015 (IN) .................. 160/CHE/2015 CS

(51) Int. Cl.
*H04W 4/00* (2018.01)
*H04W 12/06* (2009.01)
(Continued)

(52) U.S. Cl.
CPC ......... *H04W 12/06* (2013.01); *H04L 63/0853* (2013.01); *H04W 4/90* (2018.02);
(Continued)

(58) Field of Classification Search
CPC .................. H04W 4/22; H04W 12/06
See application file for complete search history.

(56) References Cited

U.S. PATENT DOCUMENTS

| 2004/0152462 A1 | 8/2004 | Hwang |
| 2013/0157673 A1 | 6/2013 | Brusilovsky |

(Continued)

FOREIGN PATENT DOCUMENTS

| CN | 102170644 | 8/2011 |
| CN | 103096425 | 5/2013 |

OTHER PUBLICATIONS

TSG SA WG1, Isolated E-UTRAN Operation for Public Safety, TD SP-140232, 3GPP TSG SA Meeting #64 Sophia-Anipolis, France, Jun. 16-18, 2014, pp. 1-6.

(Continued)

*Primary Examiner* — Omoniyi Obayanju
(74) *Attorney, Agent, or Firm* — The Farrell Law Firm, P.C.

(57) ABSTRACT

Methods and apparatuses are provided for operations in a wireless communication system. A universal subscriber identity module (USIM) application is identified that is configured with security credentials comprising an isolated evolved universal mobile telecommunications system terrestrial radio access network (E-UTRAN) operation for public safety (IOPS) identity and an access class for an IOPS operation. An authentication procedure is performed with an evolved node B (eNB) based on the security credentials. The security credentials are a distinct set of security credentials for the IOPS operation separate from those used for a normal operation.

20 Claims, 18 Drawing Sheets

(51) Int. Cl.
*H04W 4/90* (2018.01)
*H04W 48/12* (2009.01)
*H04L 29/06* (2006.01)
*H04W 8/08* (2009.01)
*H04W 76/50* (2018.01)
*H04W 8/20* (2009.01)

(52) U.S. Cl.
CPC ........... *H04W 8/082* (2013.01); *H04W 48/12* (2013.01); *H04W 8/205* (2013.01); *H04W 76/50* (2018.02)

(56) References Cited

U.S. PATENT DOCUMENTS

| | | | |
|---|---|---|---|
| 2013/0331063 | A1 | 12/2013 | Cormier et al. |
| 2014/0141763 | A1 | 5/2014 | Suh et al. |
| 2014/0200048 | A1 | 7/2014 | Cheng |
| 2014/0329503 | A1 | 11/2014 | Deng |
| 2015/0079938 | A1 | 3/2015 | Jung |
| 2017/0078947 | A1* | 3/2017 | Lee .................... H04W 4/90 |
| 2018/0242147 | A1* | 8/2018 | Fransen ............... H04W 12/04 |

OTHER PUBLICATIONS

General Dynamics UK Limited, Feasibility Study on architecture enhancements for Isolated E-UTRAN Operation for Public Safety, TD SP-140714, 3GPP TSG SA Meeting #66, Maui, Hawaii, U.S.A, Dec. 10-12, 2014, pp. 1-6.
General Dynamics UK Ltd., "Isolated E-UTRAN Operation for Public Safety (IOPS)", S2-143297, SA WG2 Meeting #105, Oct. 13-17, 2014, 4 pages.
International Search Report dated Apr. 25, 2016 issued in counterpart application No. PCT/KR2016/000231, 7 pages.
General Dynamics UK Ltd., "Further Discussion on Security Challenges for Isolated E-UTRAN Operation for Public Safety (IOPS)", S3-142475, 3GPP TSG SA WG3 (Security) Meeting #77, Nov. 17-21, 2014, 7 pages.
Qualcomm Incorporated, "IOPS Way Forward", S2-144001, SA WG2 Meeting #106, Nov. 17-21, 2014, 30 pages.
3GPP, 3rd Generation Partnership Project; Technical Specification Group Services and System Aspects; Isolated Evolved Universal Terrestrial Radio Access Network (E-UTRAN) Operation for Public Safety; Stage 1 (Release 13), 3GPP TS 22.346 V13.0.0, Sep. 26, 2014, 13 pages.
3GPP, 3rd Generation Partnership Project; Technical Specification Group Services and System Aspects; Service Accessibility (Release 11), 3GPP TS 22.011 V11.4.0, Dec. 19, 2014, 26 pages.
European Search Report dated Jan. 10, 2018 issued in counterpart application No. 16735221.0-1231, 9 pages.
Chinese Office Action dated Sep. 25, 2019 issued in counterpart application No. 201680004082.4, 19 pages.

* cited by examiner

MUTUAL AUTHENTICATION BETWEEN USER EQUIPMENT AND AN EVOLVED PACKET CORE

PRIORITY

This application is a Continuation Application of U.S. application Ser. No. 14/992,654, filed in the U.S. Patent and Trademark Office (USPTO) on Jan. 11, 2016, which claims priority under 35 U.S.C. § 119(a) to an Indian Provisional Patent Application filed on Jan. 9, 2015 in the Indian Intellectual Property Office and assigned Serial No. 160/CHE/2015(PS), and to an Indian Complete Patent Application filed on Dec. 31, 2015 in the Indian Intellectual Property Office and assigned Serial No. 160/CHE/2015(CS), the entire contents of each of which are incorporated herein by reference.

BACKGROUND

1. Field of the Invention

The present invention relates generally to wireless communication systems, and more particularly, to an apparatus for and method of mutual authentication between a User Equipment (UE) and an Evolved Packet Core (EPC).

2. Description of the Related Art

The Third Generation Partnership Project (3GPP) initiated the work on Isolated Evolved Universal Mobile Telecommunications System Terrestrial Radio Access Network (E-UTRAN) Operation for Public Safety (IOPS), where the objective is to ensure continued ability of public safety users to communicate in mission critical situations. IOPS supports recoverable mission critical network operations regardless of the existence of connection (e.g. backhaul link) between an Evolved Node B (eNodeB) and a core network. The main requirement from a security perspective for the public safety use are access of public safety UEs to an Isolated E-UTRAN and secure operation for the UEs in an Isolated E-UTRAN operation mode.

Further, it is difficult to provide authentication for the UEs when the eNodeB has lost connection with the core network. When the eNodeB is not in communication with the core network (e.g. connection disconnected), the Home Subscriber Server (HSS) (Authentication Center (AuC)) is not available (or reachable) for the eNodeB to communicate the access request received from the UE to the core network and obtain the security context for access control and secure communication. When the backhaul link to the core network is unavailable, public safety eNodeB(s) (Local Evolved Packet Core (EPC)) could either operate autonomously or coordinate with other nearby eNodeB(s) to provide locally routed communications near the public safety UEs within a region. The Isolated E-UTRAN mode of operation also provides the ability to create a serving Radio Access Network (RAN) without the backhaul link by deploying one or more standalone Nomadic eNodeBs (NeNBs). The Isolated E-UTRAN operation mode, from the perspective of security, has potentially two modes of operation:

signaling backhaul connection to an EPC is active. Thus, the communication with the AuC or HSS is possible (Mode 1); and no signaling backhaul connection to the EPC; thus, communication with the AuC or HSS is not possible (Mode 2).

In the case of Mode-1, the normal 3GPP security operation is possible. Further, in the case of Mode-2, the Isolated E-UTRAN must ensure that both user data and network signaling security is to a level comparable with that provided by Mode-1. The provision of the security features are required for the communication to occur between the UE and the NeNB and for the communication among different NeNBs. In conventional systems and methods, including complete subscriber database of potential subscribers in the eNodeBs for authentication and authorization is not a viable solution. Further, there is a high security risk of subscription credentials being exposed by the eNodeB in a compromised state. In addition to secure authentication, secure operation (e.g. integrity protection, replay protection, confidentiality protection) is required to mitigate distribution of unauthorized disaster information and eavesdropping of communication between the public safety UEs.

Thus, there is a need for a simple and robust mechanism for addressing the security issues described above when an eNodeB is not connected to a core network.

SUMMARY

An aspect of the present invention is to provide an apparatus for and a method of authenticating an EPC for IOPS.

Another aspect of the present invention is to provide an apparatus for and a method of authentication between a UE and a local EPC.

Another aspect of the present invention is to provide an apparatus for and a method of receiving an IOPS Public Land Mobile Network (PLMN) Identity (ID) broadcasted by a local EPC, where the IOPS PLMN ID indicates the local EPC is in an IOPS mode.

Another aspect of the present invention is to provide an apparatus for and a method of activating a Universal Subscriber Identity Module (USIM) supporting IOPS mode in a UE, based on a received IOPS PLMN ID from a local EPC.

Another aspect of the present invention is to provide an apparatus for and a method of authenticating a local EPC in response to receiving an IOPS PLMN ID.

Another aspect of the present invention is to provide an apparatus for and a method of sending a first request message to a local EPC.

Another aspect of the present invention is to provide an apparatus for and a method of receiving a second request message including a token from a local EPC in response to a first request message.

Another aspect of the present invention is to provide an apparatus for and method of broadcasting an IOPS PLMN ID, where the IOPS PLMN ID indicates a local EPC is in an IOPS mode.

Another aspect of the present invention is to provide an apparatus for and a method of receiving a first request message from a UE.

Another aspect of the present invention is to provide an apparatus for and a method of generating a token in response to receiving a first request message.

Another aspect of the present invention is to provide an apparatus for and a method of sending a second request message including a generated token to a UE to authenticate a local EPC.

In accordance with an aspect of the present invention, a method for operating a UE in a wireless communication system is provided. A USIM application is identified that is configured with security credentials comprising an IOPS identity and an access class for an IOPS operation. An authentication procedure is performed with an eNB based on the security credentials. The security credentials are a distinct set of security credentials for the IOPS operation separate from those used for a normal operation.

In accordance with another aspect of the present invention, an apparatus of a UE in a wireless communication system is provided. The apparatus includes a transceiver and at least one processor configured to identify a USIM application configured with security credentials comprising an IOPS identity and an access class for an IOPS operation, and perform an authentication procedure with an eNB based on the security credentials. The security credentials are a distinct set of security credentials for the IOPS operation separate from those used for a normal operation.

In accordance with another aspect of the present invention, an apparatus of an eNB in a wireless communication system is provided. The apparatus includes a transceiver, and at least one processor configured to authenticate a UE based on security credentials configured in a USIM application of the UE. The security credentials comprise an IOPS identity and an access class for an IOPS operation. The security credentials are a distinct set of security credentials for the IOPS operation separate from those used for a normal operation.

BRIEF DESCRIPTION OF DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS

Figure 1A:
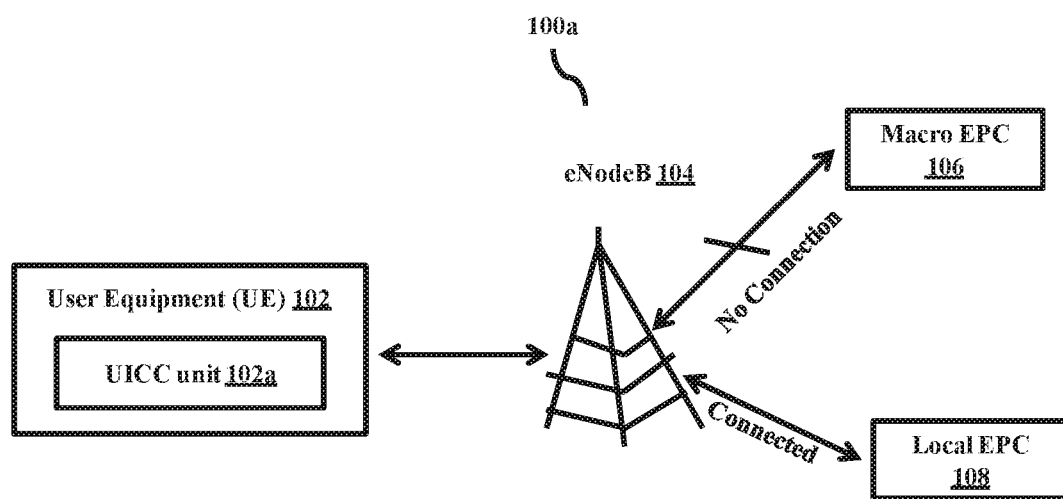
FIGS. 1A and 1B are block diagrams of a system of authentication between a UE and a local EPC, according to an embodiment of the present invention.

The embodiments herein and the various features and advantageous details thereof are described below more fully with reference to the non-limiting embodiments that are illustrated in the accompanying drawings and detailed in the following description. Descriptions of well-known components and processing techniques are omitted so as to not unnecessarily obscure the embodiments herein. In addition, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the present invention.

The present invention is described below with reference to the accompanying drawings, where like reference numerals indicate corresponding elements.

Prior to describing the embodiments in detail, definitions for key terms used herein are provided. Unless defined otherwise, all terms used herein have the same meanings as commonly understood by a person having ordinary skill in the art to which the present invention belongs. The following is a glossary of terms used in the present disclosure:

Isolated E-UTRAN IOPS-capable eNodeB: An eNodeB having the capability of IOPS mode operation, providing local Internet Protocol (IP) connectivity and public safety services to one or more IOPS-enabled UEs via a local EPC when the eNodeB has lost backhaul to a Macro EPC or it has no backhaul to the Macro EPC.

IOPS Network: An IOPS network that includes one or more eNodeBs operating in the IOPS mode and connected to the local EPC.

Local EPC: The local EPC is an entity which provides functionality that eNodeBs in the IOPS mode of operation utilize, instead of the Macro EPC, in order to support public safety services. Further, the local EPC can include Mobility Management Entity (MME), Serving Gateway/Packet Data Network Gateway (SGW/PGW), Home Subscriber Server (HSS) functionality, or a combination thereof.

Macro EPC: The EPC which serves the eNodeB when it is not in the IOPS mode of operation.

Nomadic Evolved Packet System (EPS): A deployable system which has the capability to provide radio access (via deployable IOPS-capable eNodeB(s)), the local IP connectivity, and the public safety services to the IOPS-enabled UEs in the absence of normal EPS.

IOPS-enabled UE: An UE that is configured to use networks operating in the IOPS mode. The UE is a combination of a Universal Integrated Circuit Card (UICC) and a Mobile Equipment (ME).

In an embodiment of the present invention, the IOPS provides the ability to maintain a level of communication for the public safety users, via an IOPS-capable eNodeB (or set of connected IOPS-capable eNodeB(s)), following the loss of backhaul communications. The Isolated E-UTRAN mode of operation is also applicable to the formation of a Nomadic EPS deployment, i.e. a deployment of one or more stand-alone IOPS-capable eNBs, creating a serving radio access network without backhaul communications and also providing local IP connectivity and services to public safety users in the absence of normal EPS infrastructure availability. 3GPP Technical Specification 22.346 lists the general requirements for Long Term Evolution (LTE) networks in the IOPS. A description of the architectural concept of IOPS is given in informative Annex K of 3GPP TS 23.401. Further the 3GPP TS 23.401 provides security guidelines for the operation of public safety networks in the no backhaul link to a Macro EPC scenario using the local EPC approach. The local EPC approach assumes that an IOPS network can comprise either:

a local EPC and a single isolated IOPS-capable eNodeB (or a deployable IOPS-capable eNodeB), which may be co-located or have connectivity to the Local EPC; or a local EPC and two or more IOPS-capable eNodeBs (or deployable IOPS-capable eNodeBs), which have connectivity to a single Local EPC.

Further, the local EPC includes MME, SGW, or PGW, HSS functionality, or a combination thereof. The public safety network operator dedicates a PLMN identity to an IOPS mode of operation which is broadcast in a SIB message by the eNodeB when the eNodeB is in the IOPS mode. Only authorized IOPS-enabled UEs can access a PLMN indicated as an IOPS PLMN.

The embodiments herein disclose a method of authentication between a UE and a local EPC. The method includes receiving an IOPS PLMN ID broadcast by the local EPC, where the IOPS PLMN ID indicates the local EPC is in an IOPS mode. Further, the method includes activating a USIM supporting IOPS mode in the UE based on the received IOPS PLMN ID from the local EPC.

In an embodiment, the method includes sending a first request message to the local EPC. The first request message is an ATTACH request message. Further, the method includes receiving a second request message including a token from the local EPC after receiving the first request message. In an embodiment of the present invention, the second request message is an AUTHENTICATION (AUTH) request message. Further, the method includes authenticating the local EPC based on the token.

In an embodiment, authenticating the local EPC based on the token includes generating a candidate token. After generating the candidate token, it is determined if there is a match between the token received from the local EPC and the candidate token. Further, the local EPC is authenticated in response to determining that there is a match between the token and the candidate token.

In an embodiment, authenticating the local EPC based on the token includes extracting a key associated with the local EPC by decrypting the token and authenticating the local EPC based on the key.

In an embodiment, the method further includes sending a response message including at least one parameter to the local EPC to authenticate the UE. Further, the method includes receiving an accept message from the local EPC.

In an embodiment, the token is at least one of a Random Number (RAND) and an Authentication Token (AUTN) of an Authentication and Key Agreement (AKA) procedure, a key encrypted using a public key of the UE, an IMSI, or a combination thereof.

In an embodiment, the ATTACH request message includes at least one of an Access Class, an IMSI, capability of the UE, an IMEI, and a Closed Subscriber Group (CSG) cell ID.

The embodiments herein disclose a method of authentication between the UE and the local EPC. The method includes broadcasting, by the local EPC, the IOPS PLMN ID, where the IOPS PLMN ID indicates the local EPC is in the IOPS mode.

In an embodiment, the method includes receiving the first request message from the UE. Further, the method includes generating the token in response to receiving the first request message. Further, the method includes sending the second request message including the generated token to the UE to authenticate the local EPC.

In an embodiment, the method further includes receiving a response message including the at least one parameter from the UE. Further, the method includes authenticating the UE based on the at least one parameter. Further, the method includes sending an accept message to the UE.

Unlike conventional systems and methods, the method of the present invention provides a method of access authentication for IOPS. The apparatus of the present invention provides service or RAN credentials between the UE and the eNodeB (or local EPC) for access control (e.g., permission or prohibition) for the IOPS operation based on dedicated exclusive subscription credentials, in addition to the normal subscription credentials. Further, the method of the present invention provides access class, IMEI, IMSI, or CSG ID specific credentials in addition to the normal subscription credentials for access control (e.g. mutual authentication) when the eNodeB is detached from a core network (e.g. EPC).

Unlike conventional systems and methods, the apparatus of the present invention includes generating Authentication Vector (AV) functionality in an eNodeB for IOPS access control and secure communication. Further, the apparatus of the present invention may provide an Authentication and Key Agreement (AKA) procedure over Radio Resource Control (RRC) signaling, where the AKA procedure is provided by a Packet Data Convergence Protocol (PDCP) entity or a new entity on top of the PDCP. The AKA procedure may also provide the Access Class control using Authentication Management Field (AMF) bits.

Further, the apparatus of the present invention addresses requirements such as secure storage and execution environment, mutual authentication between the UE and the Isolated E-UTRAN. Authorization (i.e., broadcast, multicast, or unicast), Over The Air protection (e.g., integrity, confidentiality, and replay protection), cryptographically separate key for one to one communication, and Authentic Anti-disaster information distribution.

Referring now to the accompanying drawings, and more particularly to FIGS. 1A through 14, where similar reference characters denote corresponding features consistently throughout the accompanying drawings, there are shown embodiments by way of example.

FIG. 1A is a block diagram of a system 100a for authentication between a UE and a local EPC, according to an embodiment described herein. The system 100a includes a UE 102, an eNodeB 104, a Macro EPC 106, and a local EPC 108. In an embodiment, the local EPC 108 may be within the eNodeB 104.

Referring to FIG. 1A, the UE 102 includes a UICC unit 102a (or simply may be referred to as a UICC or Subscriber Identity Module (SIM) card in the UE 102). In an embodiment, the local EPC 108 may include at least one of MME, SGW or PGW, and HSS functionality. The UE 102 may be a laptop computer, a desktop computer, a mobile phone, a mobile station, a mobile terminal, a smart phone, Personal Digital Assistants (PDAs), a tablet computer, a phablet, or any other electronic device.

The UICC unit 102a includes applications (e.g., SIM, Universal Subscriber Identity Module (USIM), and IP Multimedia Services Identity Module (ISIM)). In an embodiment, in addition to the applications in the UICC unit 102a, another dedicated USIM application (e.g. an IOPS application) is included by an operator or by the public safety community or agency to enable the UE 102 to communicate in the IOPS mode of operation.

In an embodiment, in order to ensure that support for the IOPS mode of operation does not compromise the security of normal operation, when the eNodeB (e.g. local EPC) operating in the IOPS mode of operation, an Authentication and Key Agreement (AKA) procedure is performed between the USIM application dedicated exclusively for the IOPS mode of operation in the UICC unit 102a, present in the UE 102, and the local HSS (included in the local EPC 108). The same applies in the event of a loss of backhaul communications and a transition of the eNodeB 104 to support an Isolated E-UTRAN operation for a population of IOPS-enabled UEs.

Further, the USIM application dedicated exclusively for the IOPS mode of operation uses a distinct set of security credentials separate from those used for normal operation. The credentials are configured in the local EPC 108 and in the UICC unit 102a prior to the commencement of the IOPS mode of operation. The USIM application dedicated exclusively for the IOPS mode of operation, in the UE 102, has a distinct set of security credentials which contains one or more of the following shown below:

a permanent key "K" (uniquely assigned for the IOPS mode of operation);

the PLMN identity assigned for IOPS network operation;

an IMSI (uniquely assigned for the IOPS mode of operation); or

Access Class status of 11 or 15 (subject to regional/national regulatory requirements and operator policy).

The credentials are provisioned in the local EPC 108 within, supporting the IOPS mode of operation where a public safety authority requires that the UE 102 be provided service in the event of the loss of backhaul communication. The storage of the IOPS network security credential set in the local EPC 108 is only performed for the UE 102 authenticated for operation in the IOPS network. Administrative provisioning is used to keep up to date security credentials for all authenticated UE 102 at the local EPC 108.

In an embodiment, the IOPS application (e.g. the USIM application dedicated for the IOPS mode of operation) is configured with an Access Class (described below in "c", "d", "e", "f", and "g"), as to restrict it, which is used for normal EPC. In addition to the existing Access Class defined in the 3$^{rd}$ Generation Partnership Project (3GPP), a new Access Class (described below in "h") may be configured by the operator.

a) Class 0-9: Normal behavior
b) Class 10: Emergency Call
c) Class 15: PLMN Staff
d) Class 14: Emergency Services (includes IOPS)
e) Class 13: Public Utilities (e.g. water, gas suppliers, or IOPS)
f) Class 12: Security Services (includes IOPS)
g) Class 11: For PLMN Use (includes IOPS).
h) Class xx: IOPS Service Initially, the UE 102 is attached to the Macro EPC 106 through the eNodeB 104 accessing the normal application. Whenever, the eNodeB 104 disconnects (e.g. backhaul link) with the Macro EPC 106 then the eNodeB 104 activates the IOPS mode of operation. In an embodiment of the present invention, whenever there is no backhaul link connection between the eNodeB 104 and the Macro EPC 106, the eNodeB 104 triggers the local EPC 108 (e.g. within the eNodeB 104). Further, the eNodeB 104 may act as the local EPC 108, performing the functionality of the local EPC 108.

Further, the eNodeB 104 or the local EPC 108 broadcasts the PLMN ID for IOPS operation and applies the Access Class as "11" or "15". The UE 102 detects the IOPS PLMN ID in the cell. If the UE 102 cannot find another suitable cell serving the Macro EPC 106 or the user manually selects the IOPS PLMN, the UE 102 activates and uses the USIM application dedicated for IOPS network access so that the UE 102 attaches to the eNodeB 104 or the local EPC 108 and obtains a local IP address, if authorized. Then, the public safety services supported by the IOPS network may be accessed.

In an embodiment, an IOPS key "$K_i$" is associated with an Access Class and is shared between the UE 102 and the eNodeB 104 or the local EPC 108. The eNodeB 104 or the local EPC 108 is preconfigured with list of keys "$K_i$" for different Access Classes of the UE 102. The UE 102 (e.g. UICC unit 102a or secure environment of the (for example, KNOX Workspace, or the like)) is preconfigured with a "$K_i$" based on its Access Class. The UICC unit 102a is configured or provisioned by the Mobile Network Operator (MNO) using an Over The Air procedure and may secure the provisioning using the SIM or USIM tool kits. A secure environment like KNOX is configured or provisioned by the MNO or third parties like a public safety authority, national regulatory authority, or the like using a Mobile Device Management (MDM) solution (e.g. MDM partners).

Since there are very limited Access Classes, a very limited number of keys is required in the eNodeB 104 or the local EPC 108 for providing secure access to the public safety UE 102. The "$K_i$" is selected by the eNodeB 104 or the local EPC 108 based on the Access Classes of the UE 102. The keys corresponding to the Access Classes are shown below:

a) Class 0-9: $K_1$
b) Class 10—IOPS: $K_7$
c) Class 15—PLMN Staff: $K_2$
d) Class 14—Emergency Services: $K_3$
e) Class 13—Public Utilities (e.g. water/gas suppliers): $K_4$
f) Class 12—Security Services: $K_5$
g) Class 11—For PLMN Use: $K_6$ In an embodiment, the existing SIM, USIM, or ISIM application, has the IOPS key with a different key index i ($K_i$) in addition to the normal or regular network access key "K", based on the Access Class.

In an embodiment, the eNodeB 104 or the local EPC 108 activates the IOPS specific authentication (e.g. AKA) by setting Authentication Management Field (AMF) bit(s). The AMF has 16 bits, of which bit "0" is used as a separation bit and bits "1" to "7" are reserved for future standardization use and bits "8" to "15" may be used for proprietary purposes. The 16 bits in the AMF are numbered from "0" to "15" where bit "0" is the most significant bit and bit "15" is the least significant bit. At least one bit is used to indicate use of the IOPS security credentials or the key index i and "$K_i$" to be used for authentication (verification and derivation of AVs) or the permitted Access Class and the corresponding key "$K_i$" to be used. Table 1 below shows the use of AMF bit to indicate the IOPS operation, key index to be used, or the permitted Access Class (or the corresponding key "$K_i$" to be used). If the network operation equals IOPS then the bits (leaving the "separation bit") in the AMF field of an AUTN shall be set to 1 to indicate to the UE 102 that the AV is only usable for AKA in the IOPS context.

TABLE 1

| 5 | 4 | 3 | 2 | 1 | 0 |
|---|---|---|---|---|---|

If the Network operation equals IOPS then bit "1" in the AMF field of the AUTN shall be set to 1 to indicate to the UE 102 that the AV is only usable for AKA in an IOPS context.

Bit "2" indicates the key index (key used or to be used to generate or verify an AV) (LTE subscription key).

Bits "3" to "7" indicate the Access Class (which is permitted to access and the corresponding key used or to be used to generate or verify the AV).

In an embodiment, the bits "3" to "6" indicate the access class (which is permitted to access and the corresponding key used or to be used to generate or verify the AV). The eNodeB 104 or the local EPC 108 generates the AVs (AUC functionality in a secure environment). Alternatively, instead of generating AVs, the eNodeB 104 or the local EPC 108 may be pre-configured with the AVs (of different Access Classes). Oracle Access Manage (OAM) server pre-configures a list of the AVs in the eNodeB 104 or the local EPC 108 (for different Access Classes). Pre-configuration of the AVs in the eNodeB 104 or the local EPC 108 does not provide a required level of security, as any compromised eNodeB or local EPC can leak the AVs and a false base station may use the stolen AVs to gain access in a particular area.

Although FIG. 1A shows the eNodeB 104 and the local EPC 108 as two separate entities, the present invention is not limited thereto. For example, the local EPC 108 may be available within the eNodeB 104. For example, the functionality of the local EPC 108 may be provisioned (or configured) in the eNodeB 104 without explicitly showing the local EPC 108 which is external to the eNodeB 104 or within the eNodeB 104 as shown in the FIG. 1B.

Figure 1B:
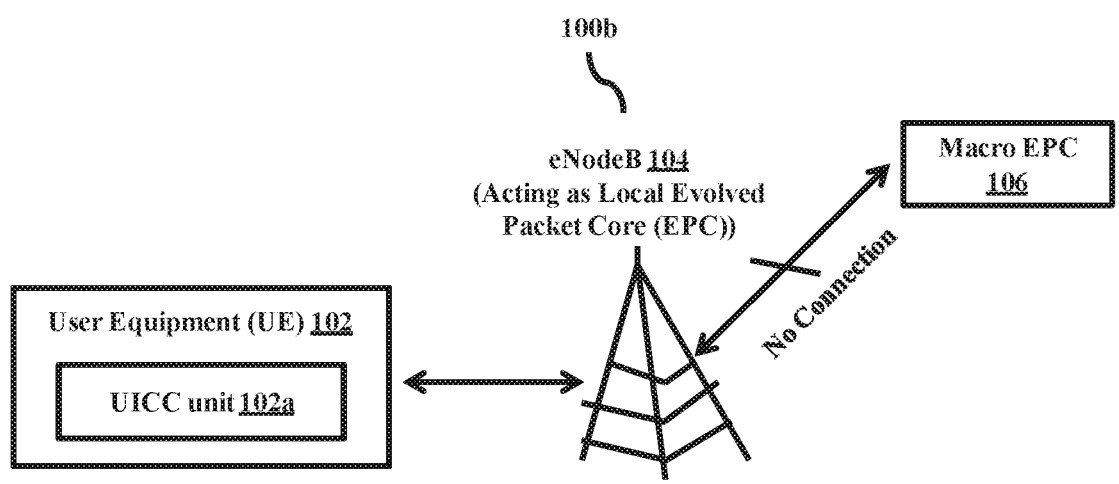

FIG. 1B is a block diagram of a system 100b for authentication between the UE 102 and the eNodeB 104 which is acting as the local EPC 108, according to an embodiment as disclosed herein. The functionality of the local EPC 108 may be provisioned or configured to the eNodeB 104, thus allowing the eNodeB 104 to act as the local EPC 108 when the connection between the eNodeB 104 and the Macro EPC 106 is lost.

FIGS. 1A and 1B show the system 100a and the system 100b, respectively. However, the present invention is not limited thereto. In an embodiment, the system 100a and the system 100b may include fewer components or additional components. Further, the labels or names of the components are used only for illustrative purposes and are not intended to limit the scope of the present invention. One or more components may be combined to perform the same or substantially the same function in system 100a and system 100b.

Figure 2:
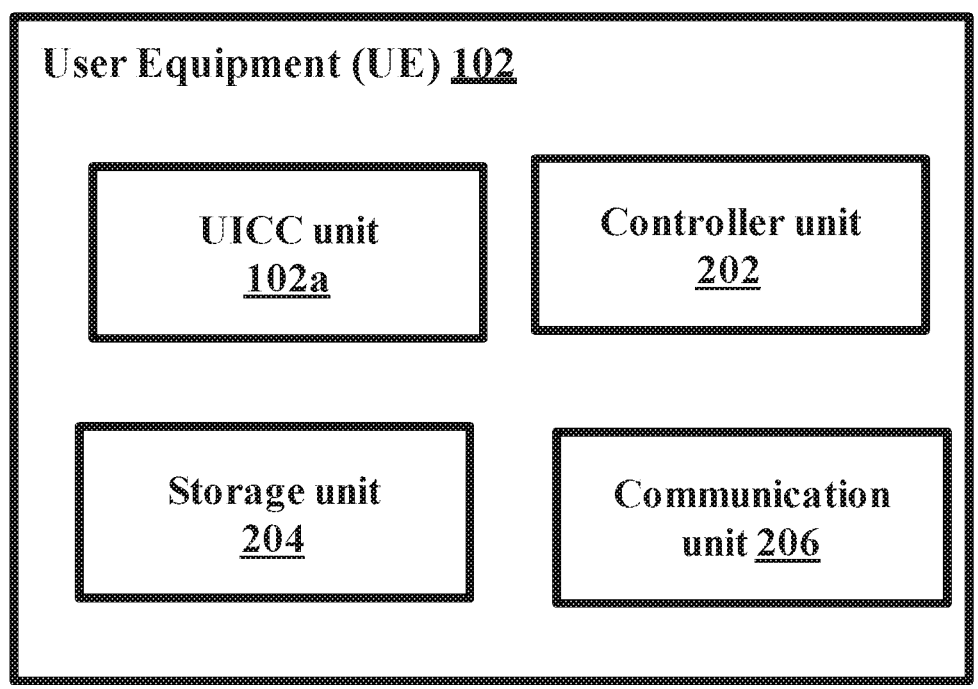
FIG. 2 is a block diagram of a UE for authenticating an eNodeB or a local EPC, according to an embodiment of the present invention.

FIG. 2 is a block diagram of the UE 102 for authenticating the eNodeB 104 or the local EPC 108, according to an embodiment as disclosed herein. The UE 102 includes a UICC unit 102a, a controller unit 202, a storage unit 204, and a communication unit 206. The controller unit 202, the storage unit 204, and the communication unit 206 may be within the UICC unit 102a. Some of the units such as the controller unit 202, the storage unit 204, and the communication unit 206 may be within the UICC unit 102a. The UICC unit 102a includes the USIM application supporting the IOPS mode of operation.

Referring to FIG. 2, the UICC unit 102a or the controller unit 202 may be configured to send a first request message to the eNodeB 104 or the local EPC 108. In an embodiment, the first request message is an ATTACH request message. The ATTACH request message may include an Access Class, an IMSI, capability of the UE 102, an IMEI, a CSG cell ID, or a combination thereof.

Further, the UICC unit 102a or the controller unit 202 may be configured to receive a second request message including a token from the eNodeB 104 or the local EPC 108. In an embodiment, the second request message is an AUTH request message. The token can be a RAND and the AUTN of the AKA procedure, the key encrypted using a public key of the UE 102 or the UICC unit 102a, an IMSI, Message Authentication Code for Integrity (MAC-I), or a combination thereof. Further, the UICC unit 102a or the controller unit 202 may be configured to authenticate the eNodeB 104 or the local EPC 108 based on the received token.

After receiving the token from the eNodeB 104 or the local EPC 108, the UICC unit 102a or the controller unit 202 may be configured to generate a candidate token. The candidate token may be the RAND and the AUTN of the AKA procedure, key encrypted using a public key of the UE 102 or the UICC unit 102a, the IMSI, a response message (RES), or a combination thereof. Further, the present invention is described below with reference to FIGS. 5 and 6.

In an embodiment, after receiving a token from the eNodeB 104 or the local EPC 108, the UICC unit 102a or the controller unit 202 may be configured to extract a key associated with the eNodeB 104 or the local EPC 108 by decrypting the token. Further, the UICC unit 102a or the controller unit 202 may be configured to authenticate the eNodeB 104 or the local EPC 108 based on the key. Further, the present invention is described below with reference to FIG. 12.

Further, the UICC unit 102a or the controller unit 202 may be configured to provide at least one parameter for a response message to the eNodeB 104 or the local EPC 108 to authenticate the UE 102. In an embodiment, the response message is an AUTH response message. The parameter may be the RES, a MAC-I, or a combination thereof. Further, the UICC unit 102a or the controller unit 202 may be configured to receive an accept message from the eNodeB 104 or the local EPC 108. The accept message is an ATTACH accept message. The storage unit 204 may be configured to store the token received from the eNodeB 104 or the local EPC 108.

Further, the storage unit 204 may include one or more computer-readable storage media. The storage unit 204 may include non-volatile storage elements. Examples of such non-volatile storage elements may include magnetic hard discs, optical discs, floppy discs, flash memories, or forms of Electrically Programmable Memories (EPROMs) or Electrically Erasable and Programmable Memories (EE-PROMs). In addition, the storage unit 204 may, in some examples, be considered a non-transitory storage medium. The term "non-transitory" may indicate that the storage medium is not embodied in a carrier wave or a propagated signal. However, the term "non-transitory" should not be interpreted to indicate that the storage unit 204 is non-movable. In some examples, the storage unit 204 may be configured to store larger amounts of information than the memory. In certain examples, a non-transitory storage medium may store data that may, over time, change (e.g., in a Random Access Memory (RAM) or a cache). The communication unit 206 may be configured to communicate internally between the units and externally with networks.

FIG. 2 shows various units of the UE 102, but it is to be understood that the present invention is not limited thereto. In an embodiment, the UE 102 may include fewer units or additional units. Further, the labels or names of the units are used only for illustrative purposes and are not intended to limit the scope of the present invention. One or more units may be combined to perform the same or substantially the same function in the UE 102.

Figure 3:
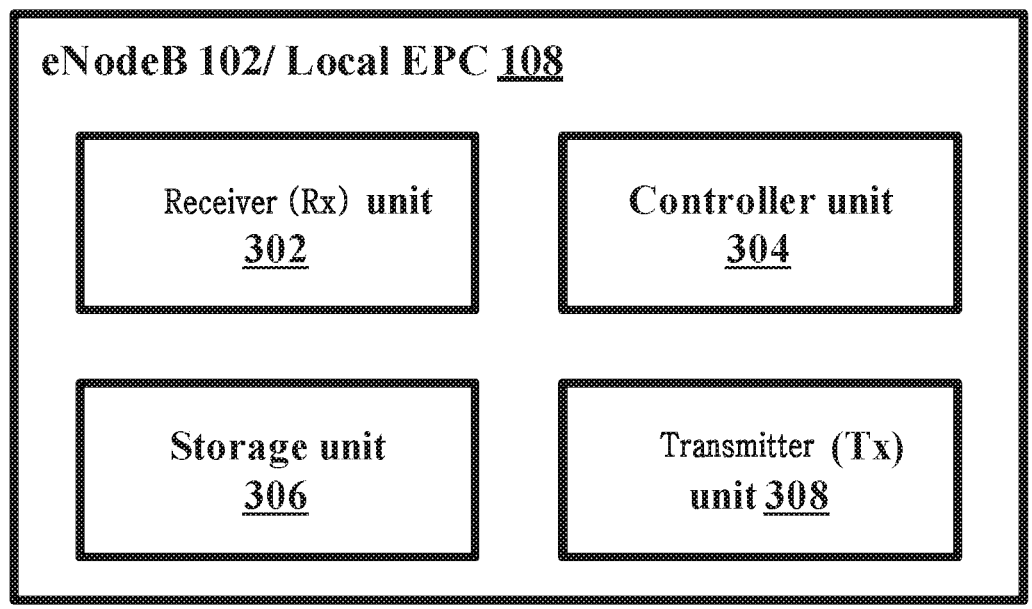
FIG. 3 is a block diagram of an eNodeB or a local EPC for authenticating a UE, according to an embodiment of the present invention.

FIG. 3 is a block diagram of the eNodeB 104 or the local EPC 108 for authenticating the UE 102, according to an embodiment as disclosed herein. The eNodeB 104 or the local EPC 108 described herein may correspond to, for example, but is not limited to, an LTE network, a Global System for Mobile Communications (GSM) Enhanced Data rates for GSM Evolution (EDGE) Radio Access Network (GERAN), a Universal Mobile Telecommunications System (UMTS) Radio Access Network (UTRAN), Evolved UTRAN (EUTRAN), or any other network. In an embodiment of the present invention, the eNodeB 104 or the local EPC 108 includes a receiver (Rx) unit 302, a controller unit 304, a storage unit 306, and a transmitter (Tx) unit 308.

Referring to FIG. 3, the Rx unit 302 may be configured to receive one or more signaling messages from the UE 102 and a network. The controller unit 304 may be configured to receive a first request message from the UE 102 using the Rx unit 302. In an embodiment, the first request message is an ATTACH request message. The ATTACH request message may include an Access Class, an IMSI, capability of the UE 102, an IMEI, an CSG cell ID, or a combination thereof. Further, the controller unit 304 may be configured to generate a token after receiving the first request message. In an embodiment, the token can be a RAND and an AUTN of an AKA procedure, key encrypted using a public key of the UE 102 or the UICC unit 102a, the IMSI, or a combination thereof. Further, the controller unit 304 may be configured to send a second request message including the generated token to the UE 102 by using the Tx unit 308. The token is used by the controller unit 304 to authenticate the eNodeB 104 or the local EPC 108.

Further, the controller unit 304 may be configured to receive a response message including at least one parameter from the UE 102 by using the Rx unit 302. The response message is an AUTH response message. The parameter may be an RES, an MAC-I, or a combination thereof. Further, the controller unit 304 may be configured to authorize the UE 102 based on at least one parameter. The controller unit 304 authorizes the UE 102 after verifying the RES received from the UE 102. The controller unit 304 may be configured to authorize the UE 102 after verifying the MAC-I. Further, the controller unit 304 may be configured to send the ATTACH accept message to the UE 102 by using the Tx unit 308. The storage unit 306 may be configured to store the generated token, which may be further used by the controller unit 304 to derive the key.

Further, the storage unit 306 may include one or more computer-readable storage media. The storage unit 306 may include non-volatile storage elements. Examples of such non-volatile storage elements may include magnetic hard discs, optical discs, floppy discs, flash memories, or forms of an EPROM or a EEPROM. In addition, the storage unit 306 may, in some examples, be considered a non-transitory storage medium. The term "non-transitory" may indicate that the storage medium is not embodied in a carrier wave or a propagated signal. However, the term "non-transitory" should not be interpreted to indicate that the storage unit 306 is non-movable. For example, the storage unit 306 may be configured to store larger amounts of information than the memory. For example, a non-transitory storage medium may store data that may, over time, change (e.g., in RAM or cache).

The FIG. 3 shows units of the eNodeB 104 or the local EPC 108 but it is to be understood that the present invention is not limited thereto. In an embodiment, the eNodeB 104 or the local EPC 108 may include fewer or more units. Further, the labels or names of the units are used only for illustrative purposes and are not intended to limit the scope of the present invention. One or more units may be combined to perform the same or substantially the same function in the eNodeB 104 or the local EPC.

Figure 4A:
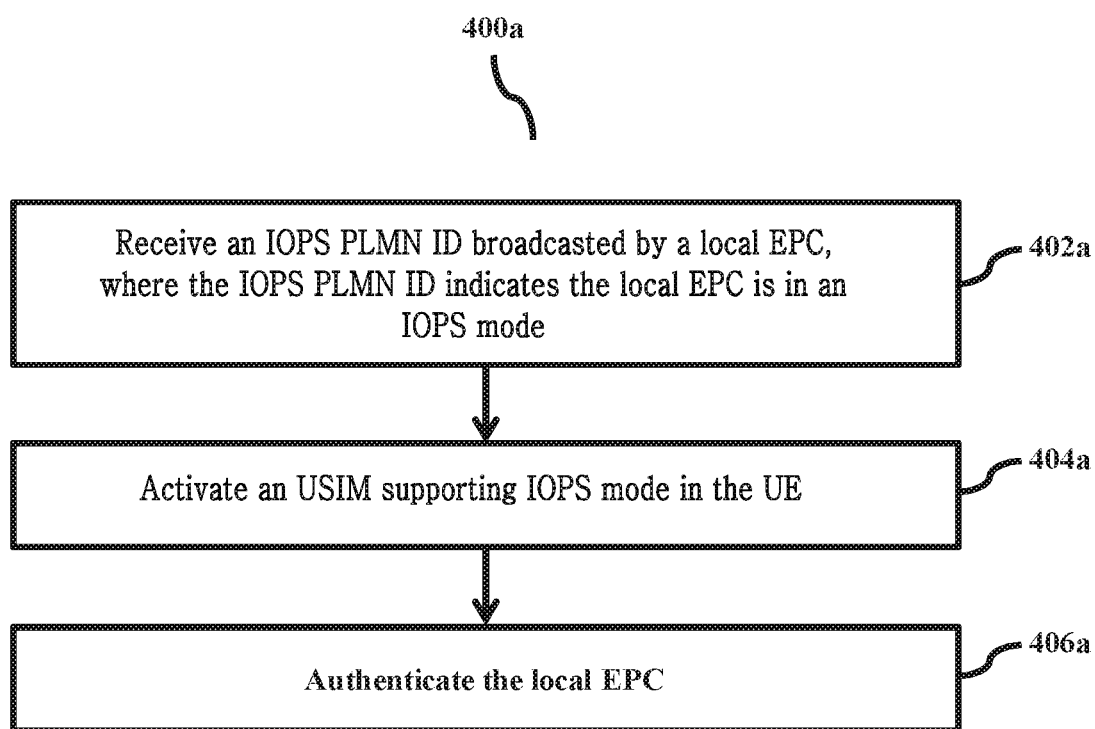
FIG. 4A is a flowchart of a method of authentication between a UE and a local EPC, according to an embodiment of the present invention.

FIG. 4A is a flowchart of a method 400a of authentication between the UE 102 and the local EPC 108, according to an embodiment as disclosed herein.

In step 402a, the method 400a receives the IOPS PLMN ID broadcast by the local EPC 108, where the IOPS PLMN ID indicates the local EPC 108 is in the IOPS mode. The method 400a allows the UE 102 to receive the IOPS PLMN ID broadcast by the local EPC 108, where the IOPS PLMN ID indicates the local EPC 108 is in the IOPS mode. In step 404a, the method 400a activates the USIM application in the UICC unit 102a. The method 400a allows the UE 102 to activate the USIM application in the UICC unit 102a. In step 406a, the method 400a authenticates the local EPC 108. The method 400a allows the USIM 102b to authenticate the local EPC 108.

The various actions, acts, blocks, steps, or the like in the method 400a may be performed in the order presented, in a different order or simultaneously. Further, in an embodiment, some of the actions, acts, blocks, steps, or the like may be omitted, added, modified, skipped, or the like without departing from the scope and spirit of the present invention.

Figure 4B:
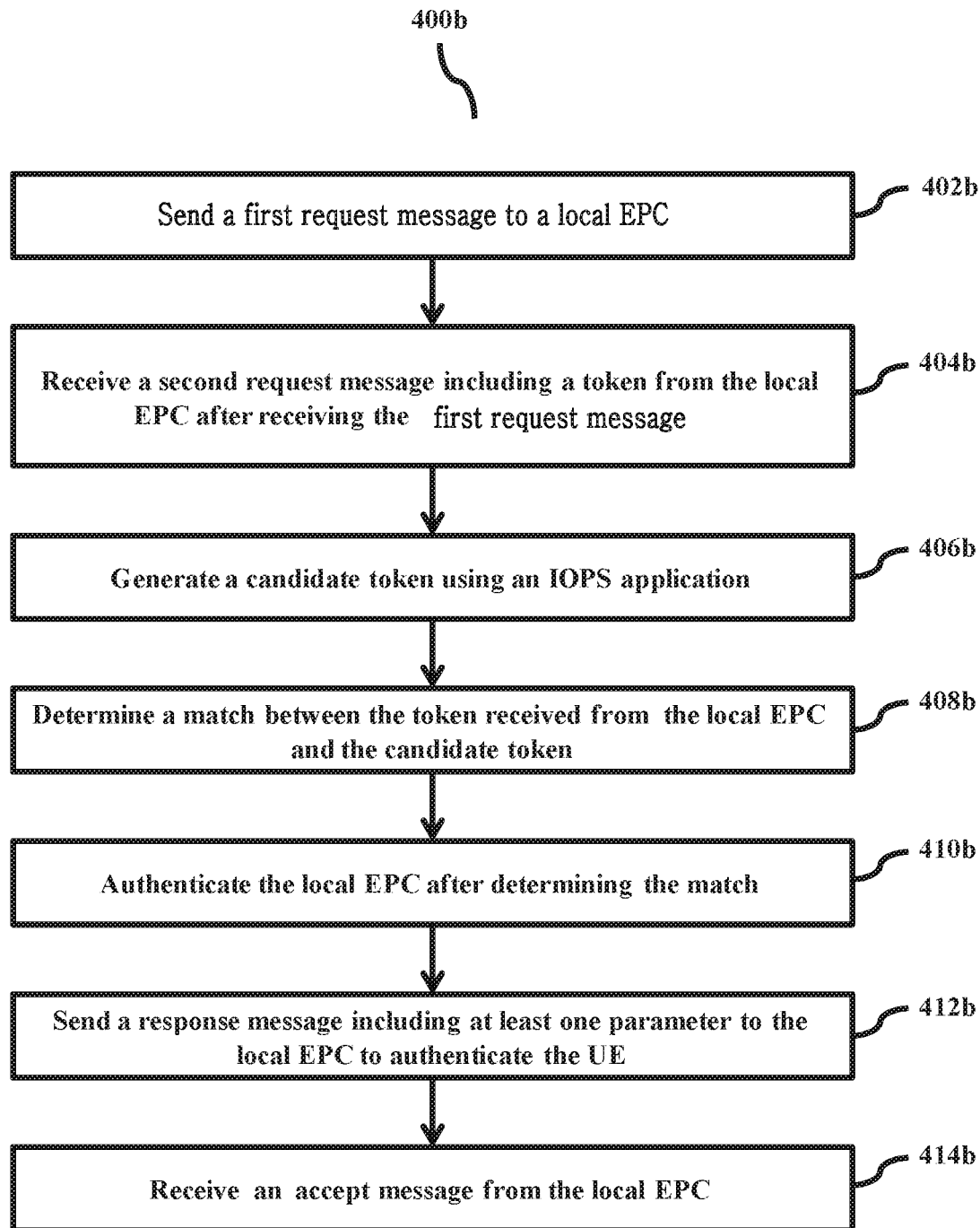
FIG. 4B is a flowchart of a method of authenticating an eNodeB or a local EPC, according to an embodiment of the present invention.

FIG. 4B is a flowchart diagram of a method 400b of authenticating the eNodeB 104 or the local EPC 108, according to an embodiment as disclosed herein.

Referring to FIG. 4, in step 402b, the method 400b sends a first request message to the eNodeB 104 or the local EPC 108. The method 400b allows the UE 102 to send the first request message to the eNodeB 104 or the local EPC 108. In an embodiment, the first request message is an ATTACH request message. The ATTACH request message can include, for example, the Access Class, the IMSI, capability of the UE 102, the IMEI, the CSG cell ID, or a combination thereof.

In step 404b, the method 400b receives a second request message including a token from the eNodeB 104 or the local EPC 108. In an embodiment, the second request message is an AUTH request message. In an embodiment, the method 400b allows the UE 102 to receive the second request message including the token from the eNodeB 104 or the local EPC 108.

In step 406b, the method 400b generates a candidate token using an IOPS application. In an embodiment, the method 400b allows the UE 102 to generate the candidate token using the IOPS application. In an embodiment, the candidate token may be an MAC-I.

In step 408b, the method 400b determines if there is a match between the token received from the eNodeB 104 or the local EPC 108 and the candidate token. In an embodiment, the method 400b allows the UE 102 to determine if there is a match between the token received from the eNodeB 104 or the local EPC 108 and the candidate token.

In step 410b, the method 400b authenticates the eNodeB 104 or the local EPC 108 after determining that there is a match between the token and the candidate token. In an embodiment, the method 400b allows the UE 102 to authenticate the eNodeB 104 or the local EPC 108 after determining that there is a match between the token and the candidate token.

In step 412b, the method 400b sends the response message including the at least one parameter to the eNodeB 104 or the local EPC 108 to authenticate the UE 102. In an embodiment, the method 400b allows the UE 102 to send the response message including the at least one parameter to the eNodeB 104 or the local EPC 108 to authenticate the UE 102. The parameter may be, for example, the RES, the MAC-I, or a combination thereof which is generated using the IOPS application.

In step 414b, the method 400b includes receiving an accept message (e.g. an ATTACH accept message) from the eNodeB 104 or the local EPC 108. In an embodiment, the method 400 allows the UE 102 to receive the ATTACH accept message from the eNodeB 104 or the local EPC 108.

The various actions, acts, blocks, steps, or the like in the method 400b may be performed in the order presented, in a different order or simultaneously. Further, in an embodiment, some of the actions, acts, blocks, steps, or the like may be omitted, added, modified, skipped, or the like without departing from the scope and spirit of the present invention.

Figure 5A:
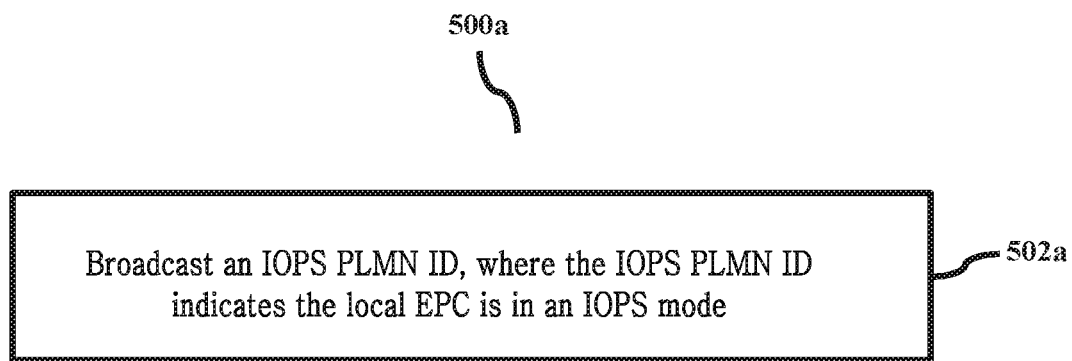
FIG. 5A is a flowchart of a method of authentication between a UE and an eNodeB or a local EPC, according to an embodiment of the present invention.

FIG. 5A is a flowchart of a method 500a of authentication between the UE 102 and the eNodeB 104 or the local EPC 108, according to an embodiment as disclosed herein.

In step 502a, the method 500a broadcasts the IOPS PLMN ID (i.e., using a SIB), where the IOPS PLMN ID indicates the eNodeB 104 or the local EPC 108 is in the IOPS mode. The method 500a allows the controller unit 304 to broadcast the IOPS PLMN ID to the UE 102 to authenticate the eNodeB 104 or the local EPC 108, where the IOPS PLMN ID indicates the eNodeB 104 or the local EPC 108 is in the IOPS mode.

The various actions, acts, blocks, steps, or the like in the method 500a may be performed in the order presented, in a different order or simultaneously. Further, in an embodiment, some of the actions, acts, blocks, steps, or the like may be omitted, added, modified, skipped, or the like without departing from the scope and spirit of the present invention.

Figure 5B:
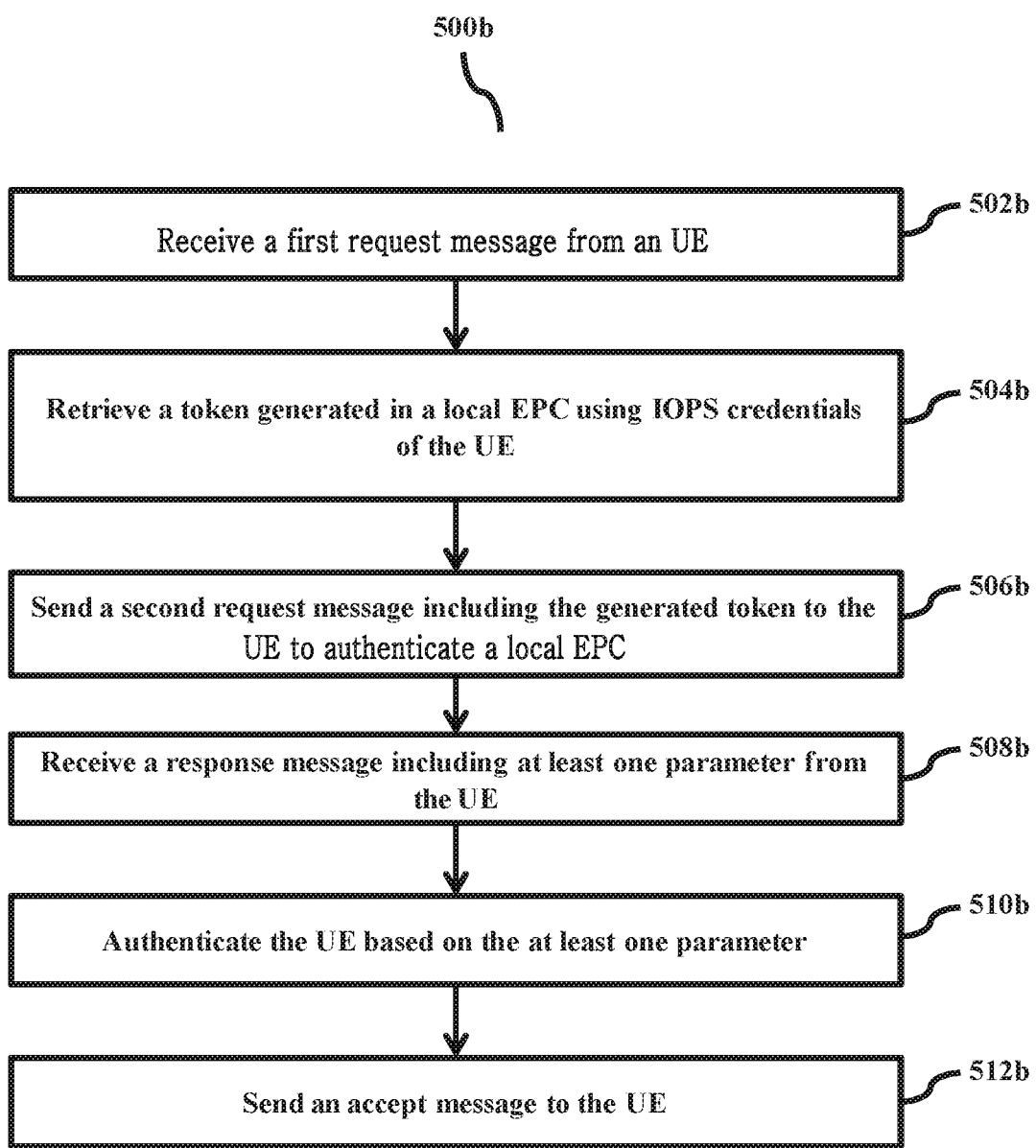
FIG. 5B is a flowchart of a method of authenticating an eNodeB or a local EPC, according to an embodiment of the present invention.

FIG. 5B is a flowchart of a method 500b of authenticating the eNodeB 104 or the local EPC 108, according to an embodiment as disclosed herein.

Referring to FIG. 5, in step 502b, the method 500b receives a first request message from the UE 102. The method 500b allows the controller unit 304 to receive the first request message from the UE 102. In step 504b, the method 500b retrieves a token generated in the Local EPC 108 using the IOPS credentials of that particular UE 102. The method 500b allows the controller unit 304 to retrieve the token generated in the local EPC 108 using the IOPS credentials of that particular UE 102.

In step 506b, the method 500b sends a second request message including the generated token to the UE 102 to authenticate the eNodeB 104 or the local EPC 108. In an embodiment, the method 500b allows the controller unit 304 to send the second request message including the generated token to the UE 102 to authenticate the eNodeB 104 or the local EPC 108. In step 508b, the method 500b receives a response message including the at least one parameter from the UE 102. The method 500b allows the controller unit 304 to receive the response message including the at least one parameter from the UE 102.

In step 510b, the method 500b authenticates the UE 102 based on the at least one parameter. In an embodiment of the present invention, the method 500b allows the controller unit 304 to authenticate the UE 102 based on the at least one parameter. In step 512b, the method 500b sends an accept message to the UE 102. In an embodiment, the method 500b allows the controller unit 304 to send the accept message to the UE 102.

The various actions, acts, blocks, steps, or the like in the method 500b may be performed in the order presented, in a different order or simultaneously. Further, in an embodiment, some of the actions, acts, blocks, steps, or the like may be omitted, added, modified, skipped, or the like without departing from the scope and spirit of the present invention.

Figure 6:
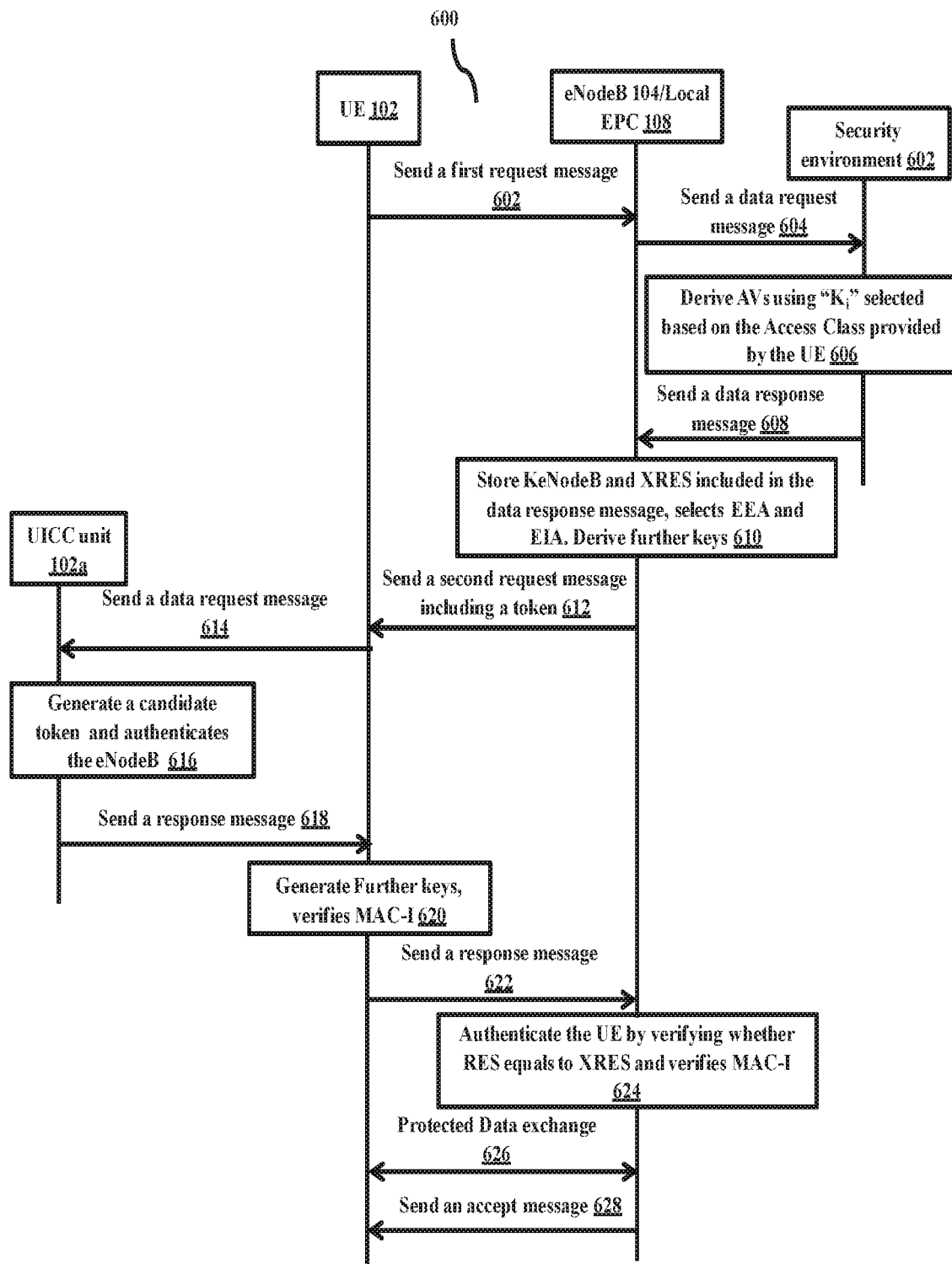
FIG. 6 is a sequence diagram for performing authentication between a UE and an eNodeB or a local EPC, according to an embodiment of the present invention.

FIG. 6 is a sequence diagram 600 for performing authentication between the UE 102 and the eNodeB 104 or the local EPC 108, according to an embodiment of the present invention as disclosed herein. In an embodiment, the signaling sequence depicts communication between the UE 102 and the eNodeB 104 or the local EPC 108.

Referring to FIG. 6, in step 602, the UE 102 sends a first request message to the eNodeB 104 or the local EPC 108. In an embodiment, the first request message is an ATTACH request message, where the ATTACH request message includes an Access Class, the IMSI, capability of the UE 102, or a combination thereof. In an embodiment, the UE 102 sends the first request message without including the Access Class in the message.

In step 604, after receiving the first request message, the eNodeB 104 or the local EPC 108 sends a data request message (i.e., AUTH data request message) to a secure environment 600a. The data request message includes the Access Class, the IMSI, or a combination thereof. Based on the received Access Class, the eNodeB 104 or the local EPC 108 requests the secure environment 602 (which may be included in the eNodeB 104 or the local EPC 108 or may be external to the eNodeB 104 or the local EPC 108) to provide AVs to authenticate the UE 102 and to grant the access for secure communication in the IOPS mode of operation.

In step 606, after receiving the data request message, the secure environment 600a derives the AVs using "$K_i$" selected based on the Access Class provided by the UE 102 through the eNodeB 104. If the Access Class is not provided by the UE 102 then, the eNodeB 104 generates the AVs using the allowed or permitted Access Class (i.e., Access Class 11) and indicates the Access Class in the AMF so that the UE 102 uses the AMF to identify the Access Class and the corresponding key to generate or verify the AV (if it is permitted).

In step 608, the secure environment 600a sends a data response message (e.g. an AUTH data response message) to the eNodeB 104 or the local EPC 108. The data response message includes a RAND, an Expected Response (XRES), the AUTN, and a $K_{eNodeB}$.

In step 610, after receiving the data response message, the eNodeB 104 or the local EPC 108 stores the $K_{eNodeB}$ and the XRES included in the data response message. Further, the eNodeB 104 or the local EPC 108 selects an Evolved Packet System (EPS) Encryption Algorithm (EEA) and an EPS Integrity Algorithm (EIA) and derives further keys.

In step 612, the eNodeB 104 or the local EPC 108 sends a second request message including a token to the UE 102. The token may be a RAND and an AUTN of an AKA procedure, the key encrypted using the public key of the UE 102, an IMSI, an MAC-I, or a combination thereof. A System Management Controller (SMC) procedure is performed along with the AKA authentication procedure. This is performed by including the selected cryptographic techniques. Further, the MAC-I is generated using the selected technique and using the security keys derived from the keys of AVs (i.e., keys corresponding to the RAND and the AUTN of an AV which is included in the message). The SMC procedure is performed separately when the eNodeB 104 or the local EPC 108 is operating in an IOPS mode of operation.

In step 614, after receiving the second request message, the UE 102 sends a data request message (e.g. an AUTH data request message) to the UICC unit 102a. The data request message includes the RAND, the AUTN, or a combination thereof.

In step 616, after receiving the data request message, the UICC unit 102a generates a candidate token. The candidate token may be an RES, an RAND and an AUTN of an AKA procedure, the key encrypted using the public key of the UE 102, the IMSI, or a combination thereof. The candidate token is generated either in the UE 102 or in the USIM application. Further, the UICC unit 102a or the controller unit 202 determines if there is a match between the token received from the eNodeB 104 or the local EPC 108 and the generated candidate token. Once a match is determined, the UICC unit 102a or the controller unit 202 authenticates the eNodeB 104 or the local EPC 108.

In step 618, after authenticating the eNodeB 104 or the local EPC 108, the UICC unit 102a or the controller unit 202 sends the data response message to the UE 102. The data response message includes an RES, a $K_{eNodeB}$, or a combination thereof.

In step 620, after receiving the data response message, the UE 102 generates further keys. The UE 102 derives further keys using a $K_{asme}$ (only the Access Stratum (AS) security keys or Non Access Stratum (NAS) security keys). Further, the UE 102 verifies the MAC-I if the SMC procedure is performed along with the AKA procedure.

In step 622, the UE 102 sends a response message including the at least one parameter to the eNodeB 104 or the local EPC 108 to authenticate the UE 102. The parameter can be the RES, the MAC-I, or a combination thereof.

In step 624, after receiving the response message, the eNodeB 104 or the local EPC 108 verifies whether the RES equals to the XRES (e.g. by PDCP entity or a new entity in the eNodeB 104 or the local EPC 108). If the RES equals to the XRES then the authentication is successful and the UE 102 is authenticated.

In step 626, after successful authentication of the UE 102, the eNodeB 104 or the local EPC 108 grants access to the UE 102 and further protected data exchange between the UE 102 and the eNodeB 104 or the local EPC 108 occurs in a secure manner.

In step 628, the eNodeB 104 or the local EPC 108 sends an accept message (i.e., an ATTACH accept message) to the UE 102.

Figure 7:
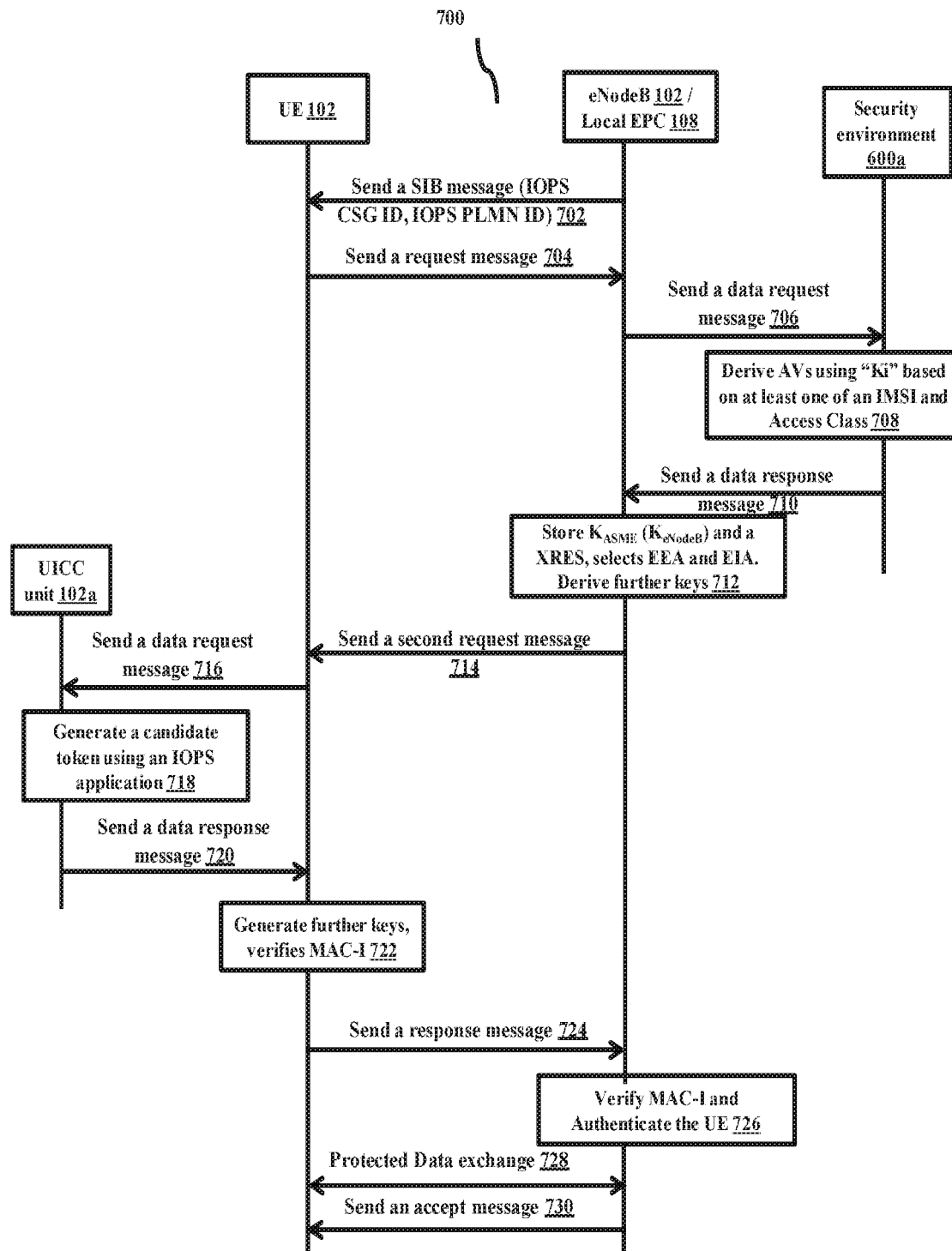
FIG. 7 is a sequence diagram for performing mutual authentication between a UE and an eNodeB or a local EPC, according to an embodiment of the present invention.

FIG. 7 is a sequence diagram 700 for performing authentication between the UE 102 and the eNodeB 104 or the local EPC 108, according to an embodiment as disclosed herein. The signaling sequence depicts communication between the UE 102 and the eNodeB 104 or the local EPC 108.

Referring to FIG. 7, in step 702, the eNodeB 104 or the local EPC 108 sends a SIB message to the UE 102. The SIB message includes an IOPS PLMN ID, an IOPS CSG ID, or a combination thereof.

In step 704, the UE 102 sends a first request message to the eNodeB 104 or the local EPC 108. The first request message is an ATTACH request message. The ATTACH request message includes an IMSI, capability of the UE 102, a CSG cell ID, or a combination thereof. The UE 102 sends the request message without including an Access Class in the message.

In step 706, after receiving the request message, the eNodeB 104 or the local EPC 108 sends a data request message to a secure environment 104a which is part of an Authentication Center (AuC). The data request message is an AUTH data request message. The AUTH data request message includes the CSG ID, the IMSI, or combination thereof. The eNodeB 104 or the local EPC 108 requests the secure environment 600a (e.g. can be that the AuC may be included in the eNodeB 104 or may be external to the eNodeB 104) to provide the AVs to authenticate the UE 102 and to grant access for secure communication in the IOPS mode of operation.

In step 708, after receiving the data request message, the secure environment 600a derives the AVs using "$K_i$" selected based on at least one of the IMSI, the Access Class provided by the UE 102 through the eNodeB 104 or the local EPC 108. If the Access Class is not provided by the UE 102 then, the eNodeB 104 or the local EPC 108 generates the AVs using the allowed or permitted Access Class (e.g. Access Class 11) and indicates the Access Class in the AMF so that the UE 102 uses the AMF to identify the Access Class and the corresponding key to generate or verify an AV (if it is permitted).

In step 710, the secure environment 600a (e.g. an AuC) sends a data response message to the eNodeB 104 or the local EPC 108. The data response message is an AUTH data response message. The AUTH data response message includes an RAND, an XRES, an AUTN, a $K_{ASME}$ ($K_{eNodeB}$), or combination thereof.

In step 712, after receiving the data response message, the eNodeB 104 or the local EPC 108 stores the $K_{ASME}$ ($K_{eNodeB}$) and the XRES included in the data response message. Further, the eNodeB 104 or the local EPC 108 selects an EEA and an EIA and derives further keys.

In step 714, the eNodeB 104 or the local EPC 108 sends a second request message including a token to the UE 102. The token can be an RAND and an AUTN of an AKA procedure, the key $K_{ASME}$ ($K_{eNodeB}$) encrypted using the public key of the UE 102, an MAC-I, or a combination thereof. An SMC procedure is performed along with the AKA authentication procedure. This is performed by including a selected cryptographic technique. Further, the MAC-I is generated using the selected technique and using the security keys derived from the keys of the AVs (e.g. keys correspond to the RAND and AUTN of the AV which is included in the message). The SMC procedure is performed separately when the eNodeB 104 or the local EPC 108 is operating in an IOPS mode of operation.

In step 716, after receiving the second request message, the UE 102 sends a data request message to the UICC unit 102a or the controller unit 202. The data request message is an AUTH data request message. The AUTH data request message includes an RAND, an AUTN, or a combination thereof.

In step 718, after receiving the data request message, the UICC unit 102a or the controller unit 202 generates a candidate token using the IOPS application. The candidate token may be an RAND and an AUTN of an AKA procedure, an RES, an IMSI, an MAC-I, a key encrypted using the public key, or a combination thereof. The candidate token is generated either in the UE 102 or in the USIM application included in the UICC unit 102a. Further, the UICC unit 102a or the controller unit 202 determines if there is a match between the token received from the eNodeB 104 or the local EPC 108 and the generated candidate token. Once a match is determined, the UICC unit 102a or the controller unit 202 authenticates the eNodeB 104 or the local EPC 108.

In step 720, after authenticating the eNodeB 104 or the local EPC 108, the UICC unit 102a or the controller unit 202 sends a data response message to the UE 102. The data response message is an AUTH data response message. The AUTH data response message includes an RES, a $K_{ASME}$ ($K_{eNodeB}$), or a combination thereof.

In step 722, after receiving the data response message, the UE 102 generates further keys. The UE 102 derives further keys using the $K_{ASME}$ (e.g. only AS security keys or NAS security keys). Further, the UE 102 verifies the MAC-I if the SMC procedure is performed along with the AKA procedure.

In step 724, the UE 102 sends the response message including at least one parameter to the eNodeB 104 or the local EPC 108 to authenticate the UE 102. The at least one parameter may be an RES, an MAC-I, or a combination thereof.

In step 726, after receiving the response message, the eNodeB 104 or the local EPC 108 verifies the MAC-I and authenticates the UE 102.

In step 728, after successful authentication of the UE 102, the eNodeB 104 or the local EPC 108 grants access to the UE 102 and further protected data exchange between the UE 102 and the eNodeB 104 or the local EPC 108 occurs in a secure manner.

In step 730, the eNodeB 104 or the local EPC 108 sends an accept message to the UE 102.

Figure 8A:
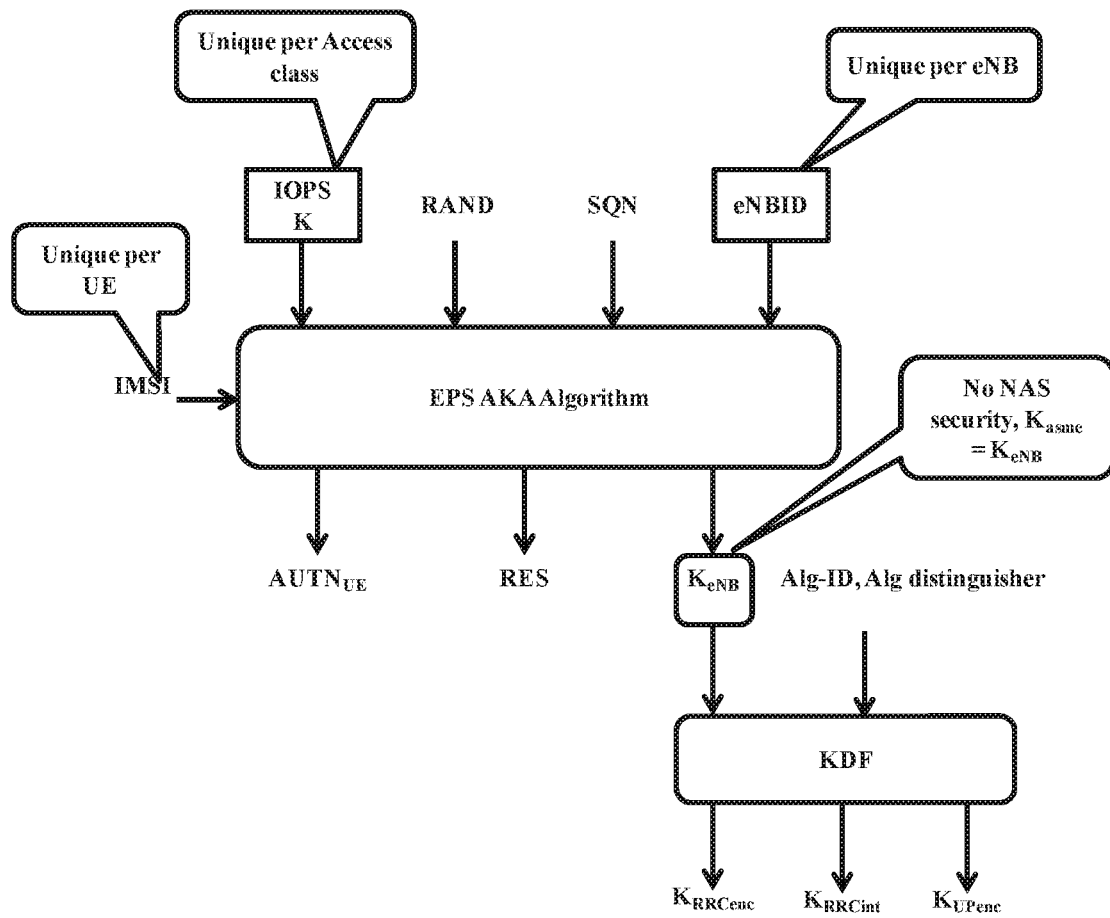
FIGS. 8A and 8B are illustrations of a key derivation method, according to an embodiment of the present invention.
Figure 8B:
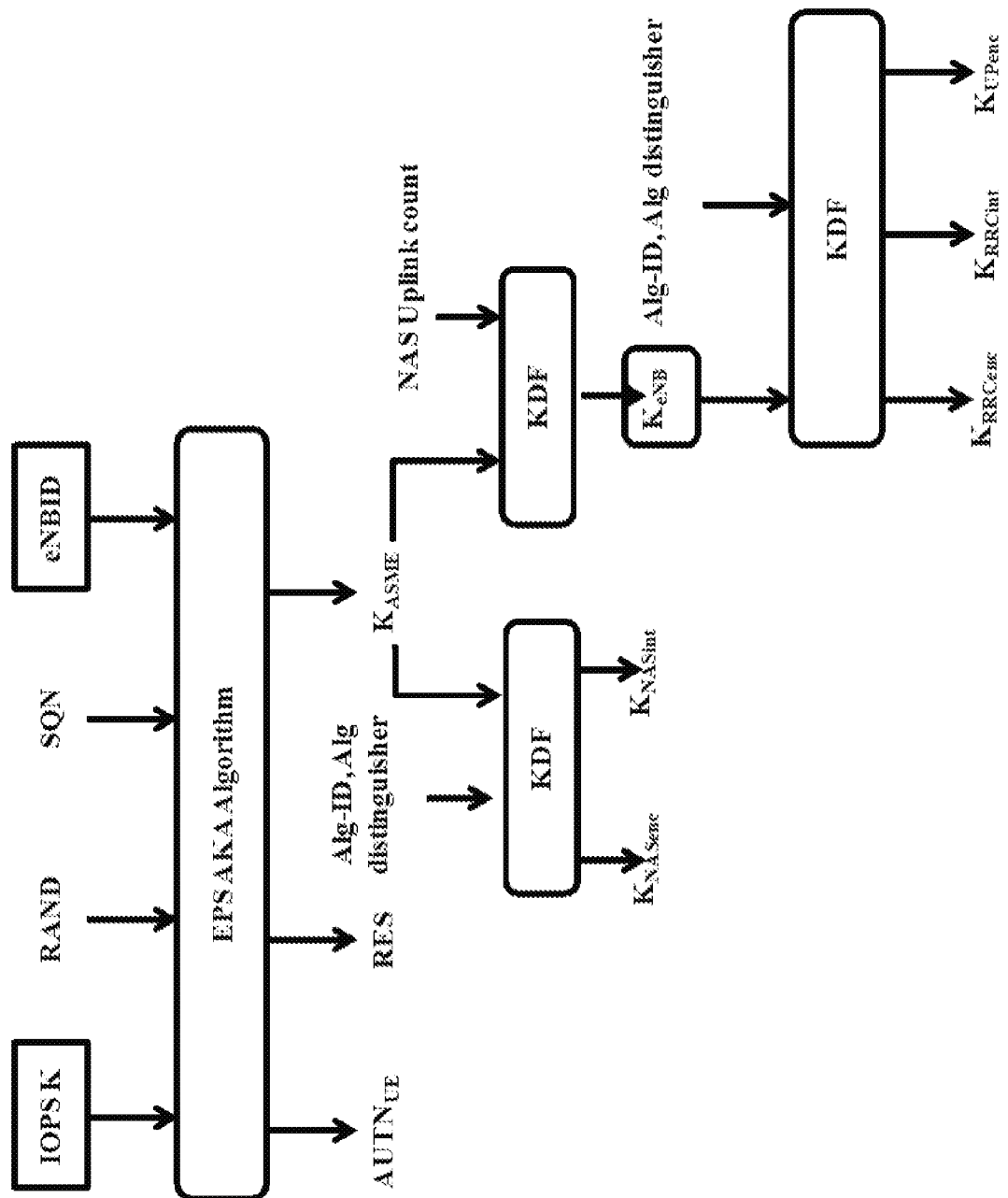

FIGS. 8A and 8B are illustrations of a key derivation method, according to an embodiment as disclosed herein. The key derivation method performed by the UE 102 and the eNodeB 104 or the local EPC 108; and further key derivation for communication protection is described below. In an embodiment of the present invention, the detailed key derivation can be used for other solutions detailed in the present invention. An RAND, an IMSI, an eNodeB ID, or a combination thereof may be used as input for a key derivation. Equation (1) for $K_{ASME\text{-}IOPS}$ is as follows:

$$K_{ASME\text{-}IOPS} = \text{EPS AKA Algorithm } (K_i, \text{ uniqueness parameter, RAND, SQN, <Other possible parameters>}) \quad (1)$$

Referring to FIGS. 8A and 8B, in an embodiment, apart from $K_i$, all other parameters are optional. A Serial Number (SN) ID may be an eNodeB ID. The eNodeB ID is included and broadcast in an SIB signaling message. In general, 20 MSB of a 28-bit field identify the eNodeB 104 or the local EPC 108.

As shown in the FIG. 8A, in an embodiment, NAS keys are not used. The derived $K_{ASME}$ is used as the eNodeB 104 or the local EPC 108 and NAS signaling, if any, is protected using an AS security context. Further, when the NAS security context is not derived, then during handover from the eNodeB 104 or the local EPC 108 to another eNodeB, only the AS security context is derived by the source eNodeB and provided to the target eNodeB, where the NAS terminates in attached eNodeB.

As shown in the FIG. 8B, in an embodiment, the NAS keys are derived and the NAS terminates in the eNodeB 104 or the local EPC 108. The eNodeB 104 or the local EPC 108 does the mobility management procedure. During handover from eNodeB 104 to another eNodeB, the NAS key (if derived and used) may remain in the eNodeB 104. Only target specific AS security context is derived by the eNodeB 104 and provided to another eNodeB, where the NAS terminates in the authenticated eNodeB.

Figure 9:
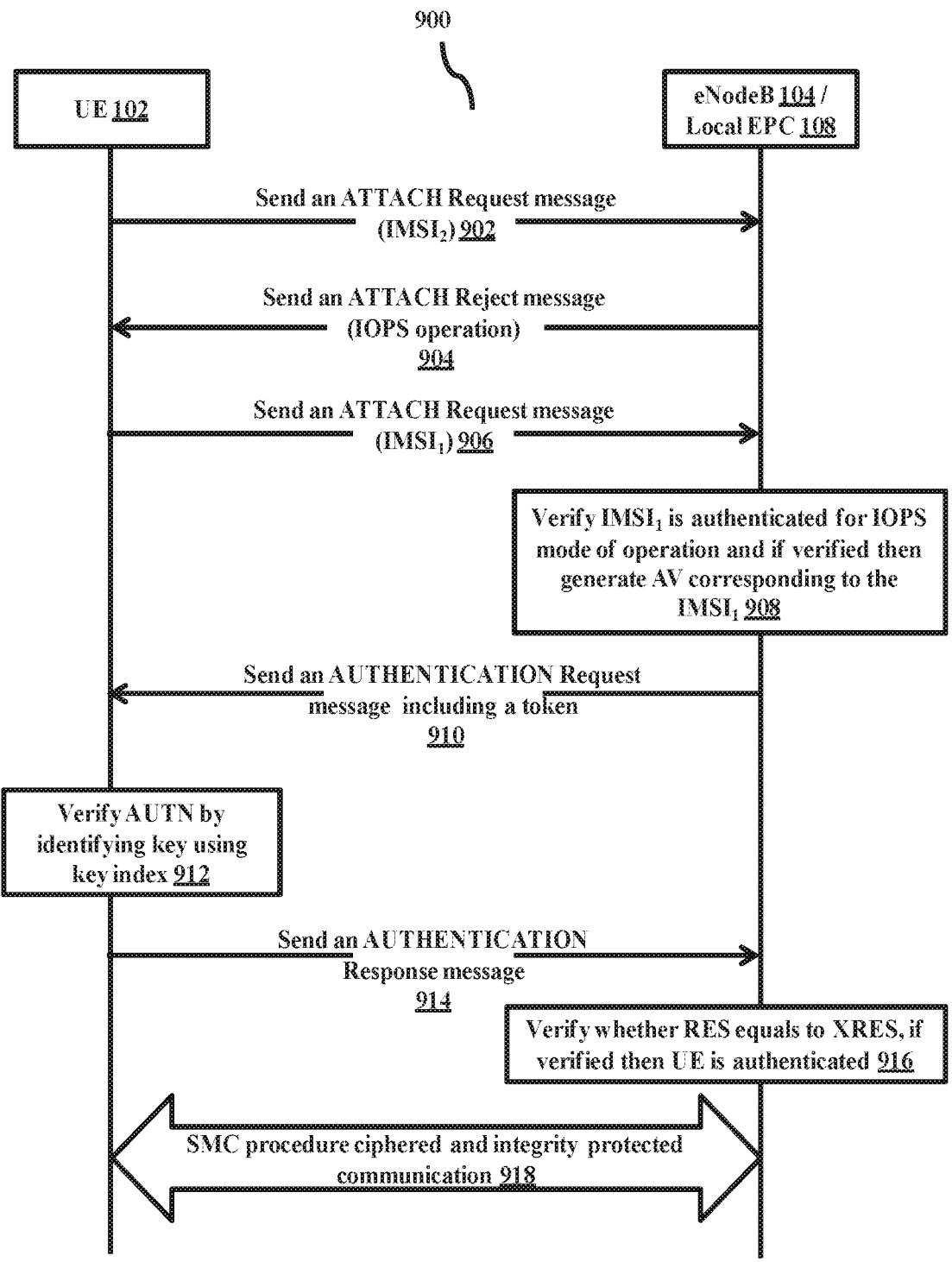
FIG. 9 is a sequence diagram for authenticating an eNodeB or a local EPC using IOPS International Mobile Subscriber Identity (IMSI), according to an embodiment of the present invention.

FIG. 9 is a sequence diagram 900 for authenticating the eNodeB 104 or the local EPC 108 using the IOPS IMSI, according to an embodiment as disclosed herein. In addition to an Access Class sent to the eNodeB 104 or the local EPC 108, IMSI(s) may be used for access control and identification of the IOPS key. For example, the IMSI(s) within the UE 102 is described below:

$IMSI_1$: xxxyyabcdef1234 associated with the key $K_1$

| MCC | xxx | Country Code |
| MNC | yy(y) | IOPS Network |
| MSIN | abcdef1234 | IOPS service capable identification number (for example ending with 1234) |
| $IMSI_2$: | 404685505601234 associated with the key $K_2$ | |
| MCC | 404 | Country |
| MNC | 68 | MNO |
| MSIN | 5505601234 | |

Referring to FIG. 9, in an embodiment, the signaling sequence depicts communication between the UE 102 and the eNodeB 104 or the local EPC 108.

In step 902, the UE 102 sends an ATTACH request message including $IMSI_2$ to the eNodeB 104 or the local EPC 108. Further, the UE 102 sends the ATTACH request message to access the eNodeB 104 or the local EPC 108 in a normal mode of operation.

In step 904, after receiving the ATTACH request message including the $IMSI_2$, the eNodeB 104 or the local EPC 108 sends an ATTACH reject message to the UE 102. The ATTACH reject message indicates that the eNodeB 104 or the local EPC 108 is in the IOPS mode of operation.

In step 906, the UE 102 sends the ATTACH request message including $IMSI_1$ to the eNodeB 104 or the local EPC 108.

In step 908, after receiving the ATTACH request message including $IMSI_1$, the eNodeB 104 or the local EPC 108 verifies whether the $IMSI_1$ is authenticated for the IOPS mode of operation. Further, if the verification is successful then, an AV corresponding to the $IMSI_1$ is generated by the eNodeB 104 or the local EPC 108.

In step 910, after successful verification and authentication vector generation, the eNodeB 104 or the local EPC 108 sends an AUTH request message including a token to the UE 102. The token may be an AUTN, an RAND, a Keyless Signature Infrastructure (KSI), a key index, or a combination thereof.

In step 912, the UE 102 verifies the AUTN by identifying the key using the key index included in the AUTH request message provided by the eNodeB 104 or the local EPC 108.

In step 914, after successful verification, the UE 102 sends an AUTH response message including the RES (e.g. parameter) to the eNodeB 104 or the local EPC 108 to authenticate the UE 102.

In step 916, after receiving the AUTH response message, the eNodeB 104 or the local EPC 108 verifies whether the RES is equal to an XRES (e.g. by PDCP entity or a new entity in the eNodeB 104 or the local EPC 108). If the RES is equal to the XRES then authentication is successful and the UE 102 is authenticated.

In step 918, an SMC procedure or integrity protected communication is performed between the UE 102 and the eNodeB 104 or the local EPC 108. The SMC procedure is performed separately when the eNodeB 104 or the local EPC 108 is operating in an IOPS mode.

Figure 10:
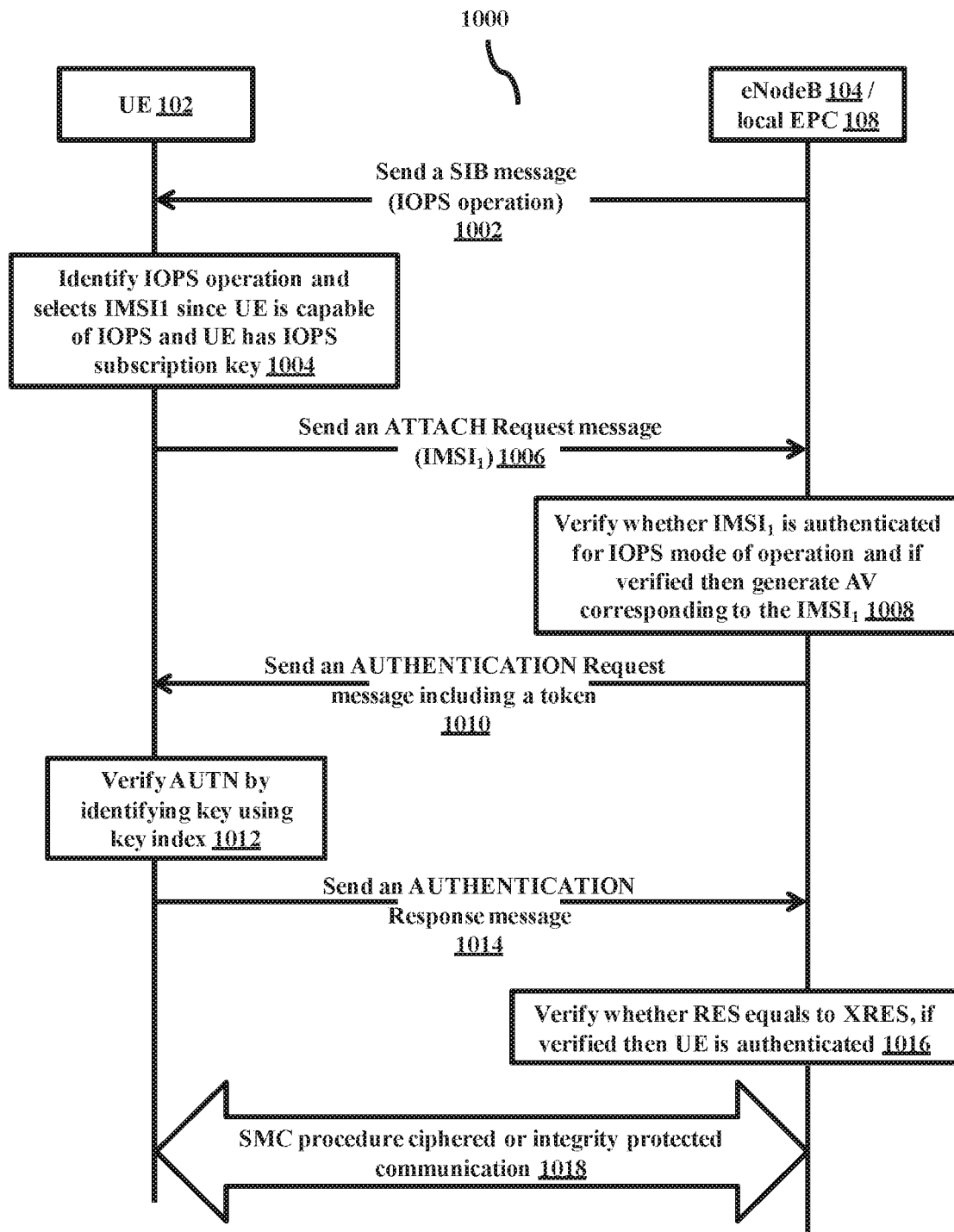
FIG. 10 is a sequence diagram for authenticating an eNodeB or a local EPC using a System Information Block (SIB) message, according to an embodiment of the present invention.

FIG. 10 is a sequence diagram 1000 for authenticating the eNodeB 104 or the local EPC 108 using an SIB message, according to an embodiment as disclosed herein. The signaling sequence depicts communication between the UE 102 and the eNodeB 104 or the local EPC 108.

Referring to FIG. 10, in step 1002, the eNodeB 104 or the local EPC 108 sends the SIB message to the UE 102 indicating that the eNodeB 104 or the local EPC 108 is in the IOPS mode of operation.

In step 1004, after receiving the SIB message, the UE 102 identifies that the eNodeB 104 or the local EPC 108 is in the IOPS mode of operation. Further, the UE 102 selects the $IMSI_1$ since the UE 102 is capable of operating in the IOPS mode and has an IOPS subscription key.

In step 1006, the UE 102 sends an ATTACH request message including an $IMSI_1$ to the eNodeB 104 or the local EPC 108.

In step 1008, after receiving the ATTACH request message including the $IMSI_1$, the eNodeB 104 or the local EPC 108 verifies whether the $IMSI_1$ is authenticated for the IOPS mode of operation. Further, if the verification is successful then, an AV corresponding to the $IMSI_1$ is generated by the eNodeB 104 or the local EPC 108.

In step 1010, after successful verification and AV generation, the eNodeB 104 or the local EPC 108 sends an AUTH request message including a token to the UE 102. The token may be an AUTN, an RAND, a KSI, a key index, or a combination thereof.

In step 1012, the UE 102 verifies the AUTN by identifying the key using the key index included in the AUTH request message provided by the eNodeB 104 or the local EPC 108.

In step 1014, after successful verification, the UE 102 sends an AUTH response message including an RES (e.g. parameter) to the eNodeB 104 or the local EPC 108 to authenticate the UE 102.

In step 1016, after receiving the AUTH response message, the eNodeB 104 or the local EPC 108 verifies whether the RES is equal to an XRES (e.g. by PDCP entity or a new entity in the eNodeB 104 or the local EPC 108). If the RES is equal to the XRES then authentication is successful and the UE 102 is authenticated.

In step 1018, an SMC procedure or integrity protected communication is performed between the UE 102 and the eNodeB 104 or the local EPC 108. The SMC procedure is performed separately when the eNodeB 104 or the local EPC 108 is operating in an IOPS mode.

Figure 11:
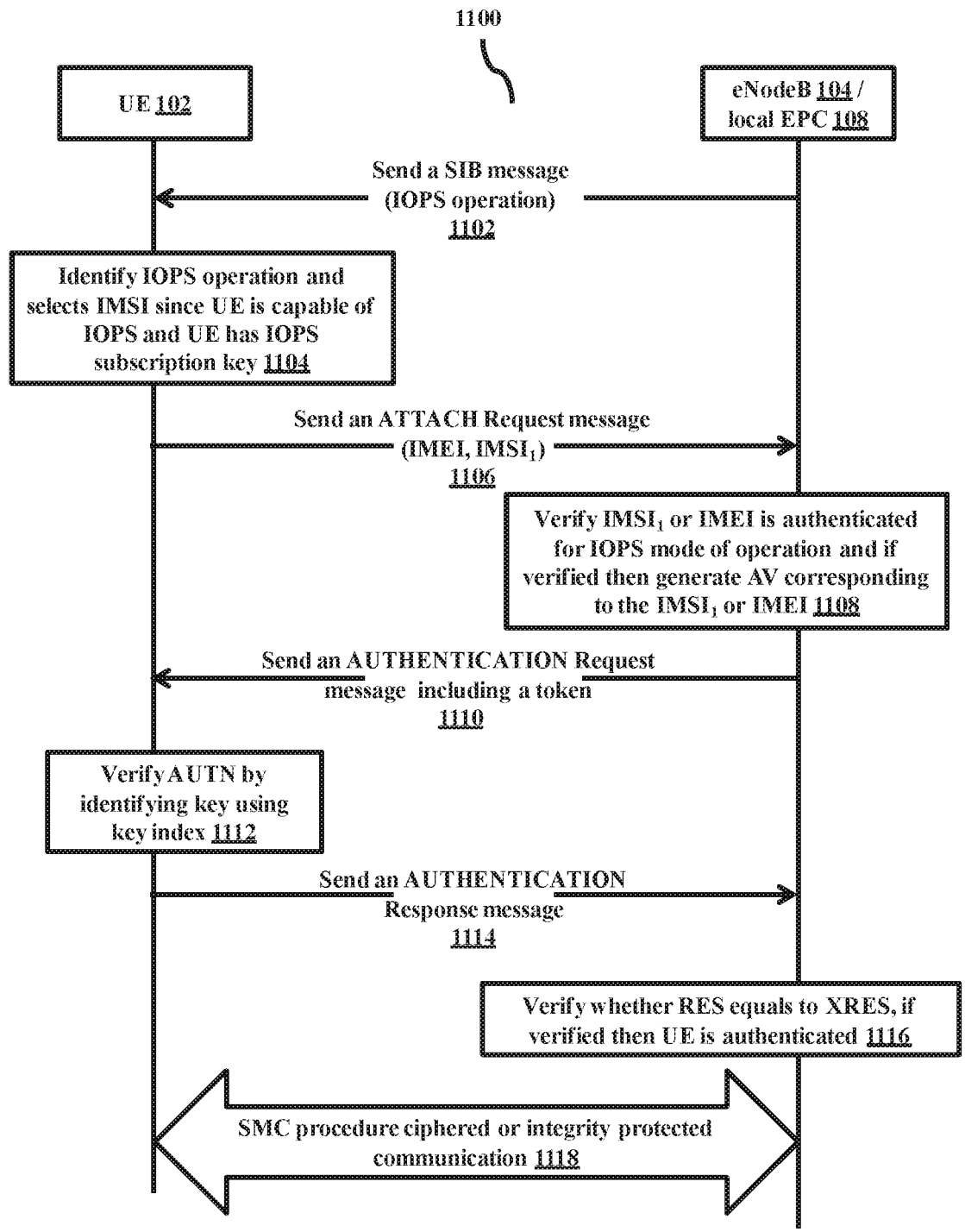
FIG. 11 is a sequence diagram for authenticating an eNodeB or a local EPC by using an IMSI and an International Mobile Station Equipment Identity (IMEI), according to an embodiment of the present invention.

FIG. 11 is a sequence diagram 1100 for authenticating the eNodeB 104 or the local EPC 108 using an IMSI and an IMEI, according to an embodiment as disclosed herein. In addition to an Access Class sent to the eNodeB 104 or the local EPC 108, the IMEI may be used for access control and identification of the IOPS key. For example, the format of the IMEI within the UE 102 is described below Table 2:

TABLE 2

| IMEISV | AABBBBBB TAC | CCCCCC Serial Number (IOPS service capable device) | EE Software version number (SVN) |
|---|---|---|---|

Referring to FIG. 11, in an embodiment of the present invention, the signaling sequence depicts communication between the UE 102 and the eNodeB 104 or the local EPC 108.

In step 1102, the eNodeB 104 or the local EPC 108 sends an SIB message indicating the UE 102 that the eNodeB 104 or the local EPC 108 is in an IOPS mode of operation.

In step 1104, after receiving the SIB message, the UE 102 identifies that the eNodeB 104 or the local EPC 108 is in the IOPS mode of operation. Further, the UE 102 selects an $IMSI_1$ since the UE 102 is capable of operating in the IOPS mode and has an IOPS subscription key.

In step 1106, the UE 102 sends an ATTACH request message including an $IMSI_1$ and an IMEI to the eNodeB 104 or the local EPC 108.

In step 1108, after receiving the ATTACH request message including the $IMSI_1$ and the IMEI, the eNodeB 104 or the local EPC 108 verifies whether the $IMSI_1$ or the IMEI is authorized for the IOPS mode of operation. Further, if the verification is successful then, an AV corresponding to the $IMSI_1$ or the IMEI is generated by the eNodeB 104 or the local EPC 108.

In step 1110, after successful verification and AV generation, the eNodeB 104 or the local EPC 108 sends an AUTH request message including a token to the UE 102. The token may be an AUTN, an RAND, a KSI, a key index, or a combination thereof.

In step 1112, the UE 102 verifies the AUTN by identifying the key using the key index included in the AUTH request message provided by the eNodeB 104 or the local EPC 108.

In step 1114, after successful verification, the UE 102 sends an AUTH response message including an RES (e.g. a parameter) to the eNodeB 104 or the local EPC 108 to authorize the UE 102.

In step 1116, after receiving the AUTH response message, the eNodeB 104 or the local EPC 108 verifies whether the RES is equal to an XRES (e.g. by PDCP entity or a new entity in the eNodeB 104 or the local EPC 108). If the RES is equal to the XRES then the authentication is successful and the UE 102 is authenticated.

In step 1118, an SMC procedure or integrity protected communication is performed between the UE 102 and the eNodeB 104 or the local EPC 108. The SMC procedure is performed separately when the eNodeB 104 or the local EPC 108 is operating in an IOPS mode.

Figure 12:
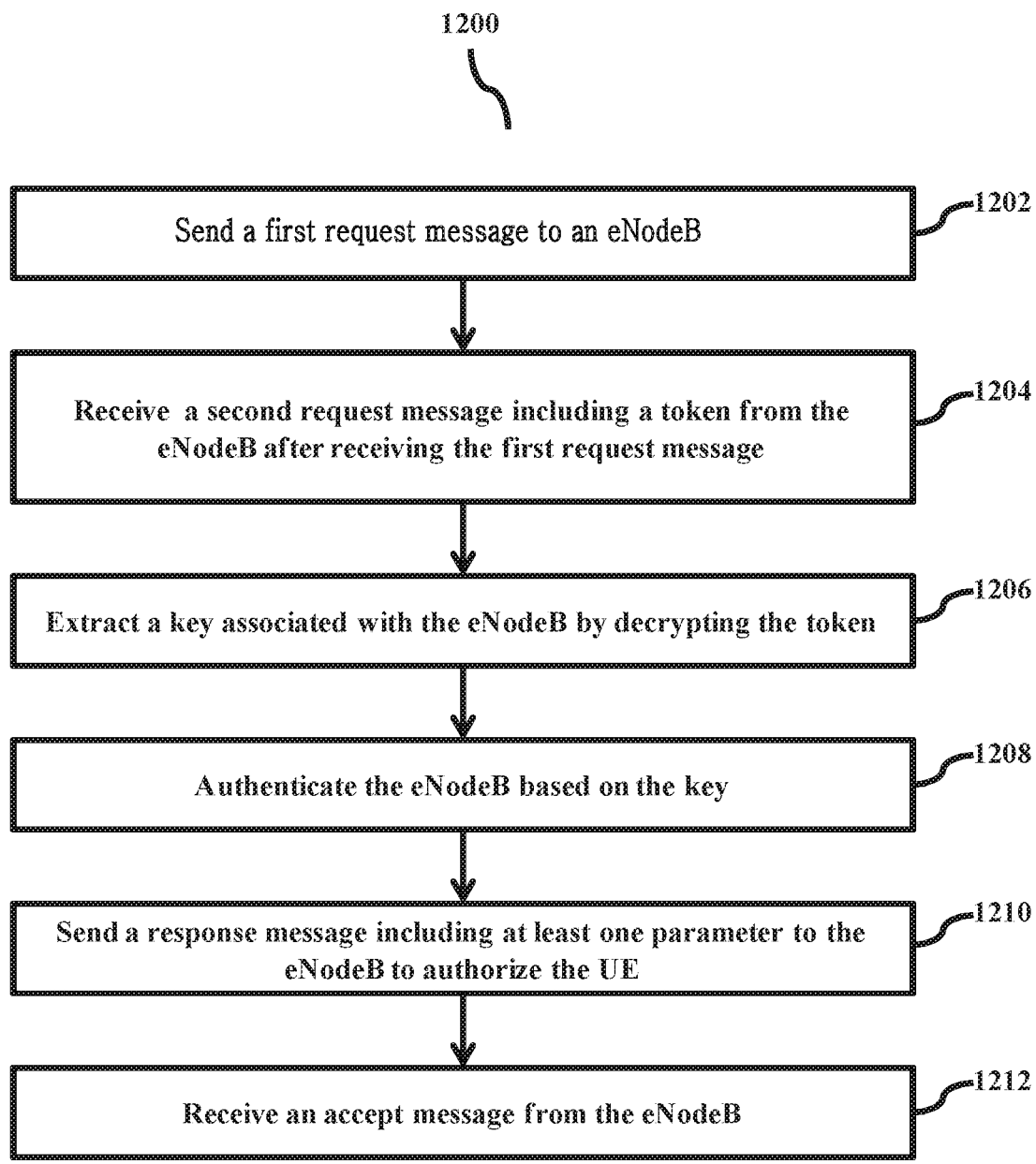
FIG. 12 is a flowchart of a method of authenticating an eNodeB or a local EPC, according to an embodiment of the present invention.

FIG. 12 is a flowchart of a method 1200 of authenticating the eNodeB 104 or the local EPC 108, according to an embodiment as disclosed herein. In step 1202, the method 1200 sends an ATTACH request message to the eNodeB 104 or the local EPC 108. The method 1200 allows the USIM 102b to send the ATTACH request message to the eNodeB 104 or the local EPC 108. The ATTACH request message may include, for example, an Access Class, an IMSI, capability of the UE 102, an IMEI, a CSG cell ID, or a combination thereof.

Referring to FIG. 12, in step 1204, the method 1200 receives a second request message (e.g. an AUTH request message) including a token from the eNodeB 104 or the local EPC 108. The method 1200 allows the USIM 102b to receive the AUTH request message including the token from the eNodeB 104 or the local EPC 108.

In step 1206, the method 1200 includes extracting a key associated with the eNodeB 104 or the local EPC 108 by decrypting the token. The method 1200 allows the USIM 102b to extract the key associated with the eNodeB 104 or the local EPC 108 by decrypting the token. The method 1200 allows the USIM 102b to extract the key associated with the eNodeB 104 or the local EPC 108 by decrypting the token.

In step 1208, the method 1200 authenticates the eNodeB 104 or the local EPC 108 based on the key. The method 1200 allows the USIM 102b to authenticate the eNodeB 104 or the local EPC 108 based on the key. The method 1200 allows the USIM 102b to authenticate the eNodeB 104 or the local EPC 108.

In step 1210, the method 1200 sends a response message (e.g. an AUTH response message) including at least one parameter to the eNodeB 104 or the local EPC 108 to authenticate the UE 102. The method 1200 allows the USIM 102b to send the AUTH response message including the at least one parameter to the eNodeB 104 or the local EPC 108 to authenticate the UE 102. The at least one parameter may be, for example, an RES, an MAC-I, or a combination thereof.

In step 1212, the method 1200 receives an accept message (e.g. an ATTACH Accept message) from the eNodeB 104 or the local EPC 108. The method 1200 allows the USIM 102b to receive the ATTACH Accept message from the eNodeB 104 or the local EPC 108.

The various actions, acts, blocks, steps, or the like in the method 1200 may be performed in the order presented, in a different order or simultaneously. Further, in an embodiment, some of the actions, acts, blocks, steps, or the like may be omitted, added, modified, skipped, or the like without departing from the scope and spirit of the present invention.

Figure 13:
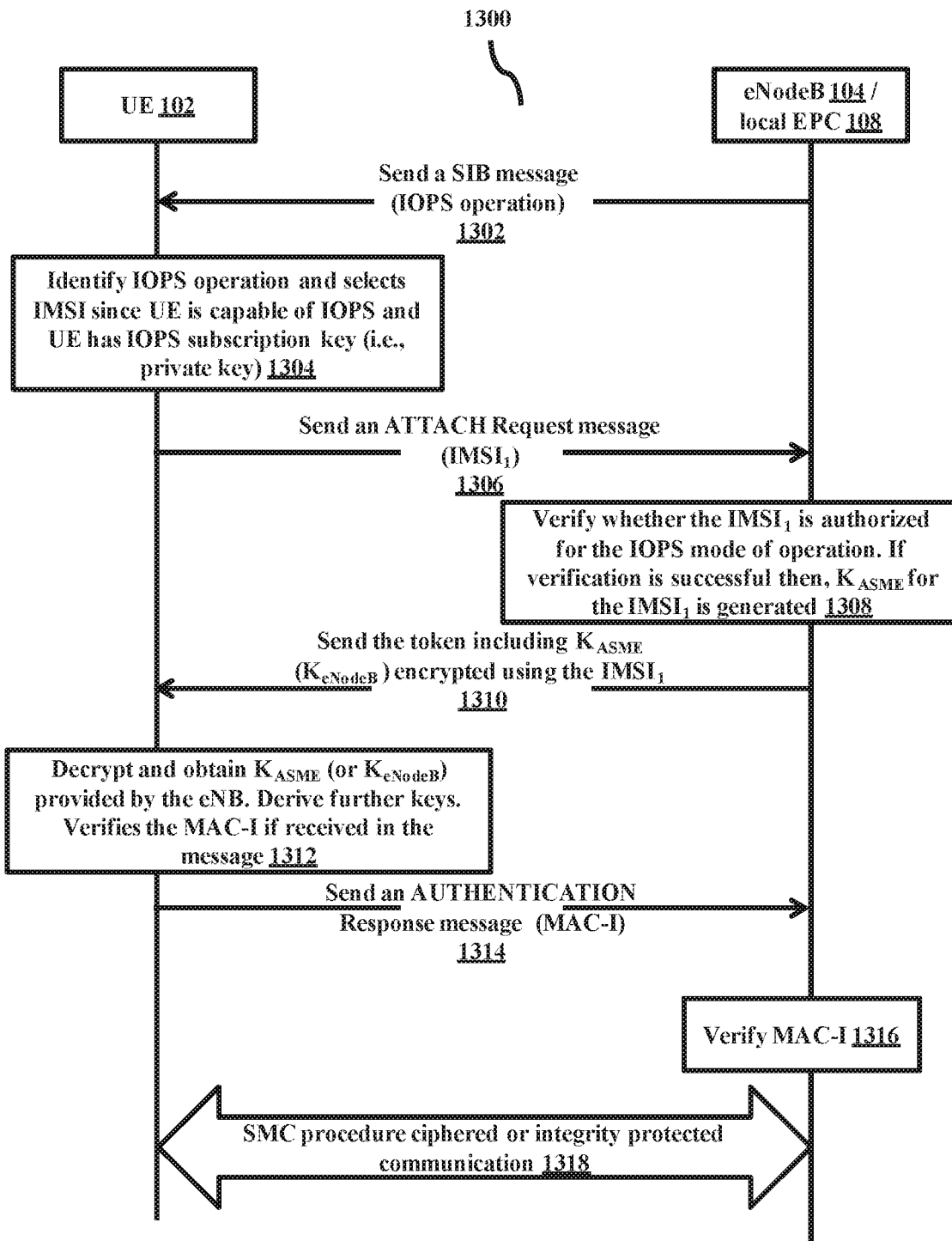
FIG. 13 is a sequence diagram for identity based cryptography for $K_{ASME}$ ($K_{eNodeB}$) exchange message flow, according to an embodiment of the present invention.

FIG. 13 is a sequence diagram 1300 for Identity Based Cryptography (IBC) for $K_{ASME}$ ($K_{eNodeB}$) exchange message flow, according to an embodiment as disclosed herein. IBC is used to perform a key exchange, thereby protecting a communication between the UE 102 and the eNodeB 104 or the local EPC 108 operating in an IOPS mode. The UE 102 is provisioned with a private key corresponding to its IMSI, IMEI, or Mobile Subscriber Integrated Services Digital Network number (MSISDN) (e.g. public key) in the USIM 102b along with related parameters. Instead of IBC, a regular private key/public key is used.

Referring to FIG. 13, the eNodeB 104 is provisioned with the private key corresponding to its identity (e.g. Peripheral Component Interconnect (PCI) or eNodeB ID as the public key) along with related parameters. Instead of IBC, a regular private key/public key is used. The eNodeB 104 or the local EPC 108 may have a list (or a range) of IMSIs, IMEIs or MSISDNs which are public-safety enabled UE 102. The communication is protected between the UE 102 and the eNodeB 104 or the local EPC 108 as follows, the eNodeB 104 or the local EPC 108 uses IMSI to protect the data (which can be the key $K_{ASME}$) for a particular UE 102. The UE 102 uses eNodeB-ID (for example, PCI, eNodeB ID, or the like) to protect the data when communicating with the eNodeB 104 or the local EPC 108.

Further, using IBC, the $K_{ASME}$ (or $K_{eNodeB}$) is shared between the eNodeB 104 or the local EPC 108 and the UE 102 for a certain period of time or for a certain session. The private key associated with the IMSI or eNodeB ID is securely stored in the USIM 102b or secure environment. The signaling sequence depicts communication between the UE 102 and the eNodeB 104 or the local EPC 108.

In step 1302, the eNodeB 104 or the local EPC 108 sends an SIB message to the UE 102 indicating that the eNodeB 104 or the local EPC 108 is in the an IOPS mode of operation.

In step 1304, after receiving the SIB message, the UE 102 identifies that the eNodeB 104 or the local EPC 108 is in the IOPS mode of operation. Further, the UE 102 selects the $IMSI_1$ since the UE 102 is capable of operating in the IOPS mode and has an IOPS subscription key (e.g. a private key).

In step 1306, the UE 102 sends an ATTACH request message including an $IMSI_1$ to the eNodeB 104 or the local EPC 108.

In step 1308, after receiving the ATTACH request message including the $IMSI_1$, the eNodeB 104 or the local EPC 108 verifies whether the $IMSI_1$ is authorized for the IOPS mode of operation. Further, if the verification is successful then, a $K_{ASME}$ for the $IMSI_1$ is generated.

In step 1310, after successful verification and key generation, the eNodeB 104 or the local EPC 108 sends a token to the UE 102. The token includes the $K_{ASME}$ (or $K_{eNodeB}$) encrypted using the $IMSI_1$ (as a public key). The token includes the MAC-I of the message calculated from the RRC initial key derived from the $K_{eNodeB}$, selected security techniques, and KSI (e.g. index of the $K_{eNodeB}$).

In step 1312, after receiving the AUTH request message, the UE 102 decrypts and obtains the $K_{ASME}$ (or $K_{eNodeB}$) provided by the eNodeB 104 or the local EPC 108. Further, the UE 102 derives keys and verifies an MAC-I if received in the message.

In step 1314, the UE 102 sends an AUTH response message including the MAC-I (e.g. a parameter) to the eNodeB 104 or the local EPC 108 to authenticate the UE 102.

In step 1316, after receiving the AUTH response message, the eNodeB 104 or the local EPC 108 verifies the MAC-I. Upon successful verification, the UE 102 is authenticated by the eNodeB 104 or the local EPC 108.

In step 1318, an SMC procedure or integrity protected communication is performed between the UE 102 and the eNodeB 104 or the local EPC 108. The SMC procedure is performed separately when the eNodeB 104 or the local EPC 108 is operating in an IOPS mode.

In an embodiment of the present invention, the SMC procedure (e.g. step 1318) may be performed separately. Instead of a separate SMC procedure, an SMC procedure may be performed along with key distribution (e.g. steps 1310, 1312, and 1314).

Figure 14:
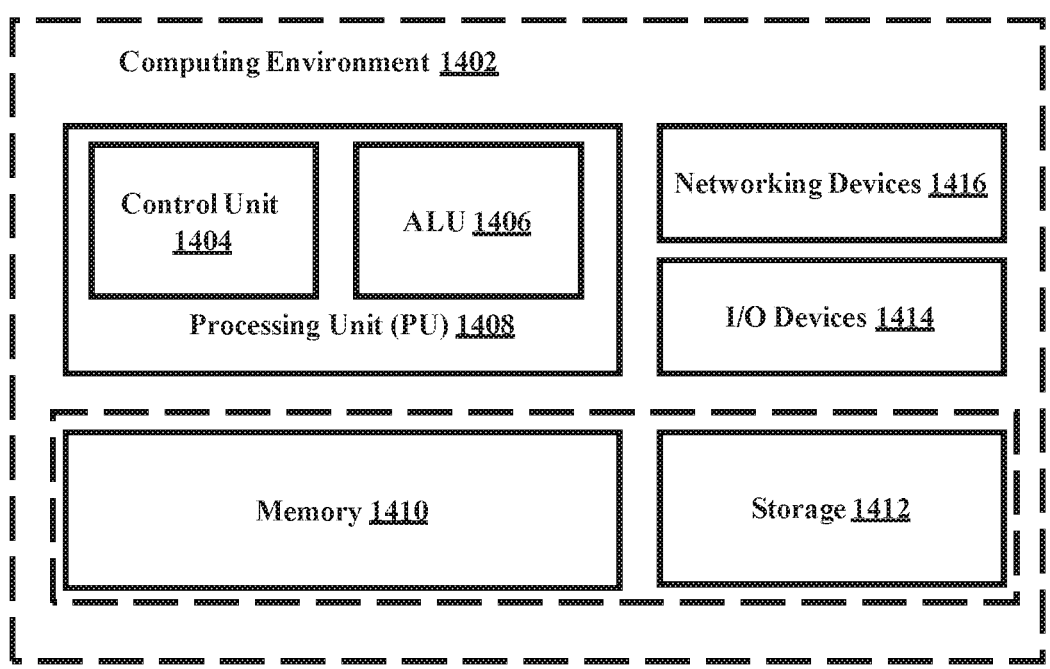
FIG. 14 is a block diagram of a computing environment implementing a method and system of authentication between a UE and a local EPC, according to an embodiment of the present invention.

FIG. 14 is a block diagram of a computing environment implementing the method and system of authentication between the UE 102 and the local EPC 108, according to an embodiment as disclosed herein.

Referring to FIG. 14, the computing environment 1402 includes at least one processing unit 1408 that is equipped with a control unit 1404 and an Arithmetic Logic Unit (ALU) 1406, a memory 1410, storage 1412, a plurality of networking devices 1416 and a plurality Input output (I/O) devices 1414. The processing unit 1408 is responsible for processing instructions of techniques. The processing unit 1408 receives commands from the control unit 1404 in order to perform its processing. Further, any logical and arithmetic operations involved in the execution of the instructions are computed with the help of the ALU 1406.

The computing environment 1402 may include multiple homogeneous or heterogeneous cores, multiple CPUs of different kinds, special media and other accelerators. The processing unit 1408 is responsible for processing the instructions of the techniques. Further, the processing unit 1408 may be on a single chip or on multiple chips.

A technique including instructions and code required for the implementation are stored in either the memory unit 1410, the storage 1412, or both. At the time of execution, instructions may be fetched from the corresponding memory 1410 or storage 1412, and executed by the processing unit 1408.

In case of any hardware implementations, various networking devices 1416 or external I/O devices 1414 may be connected to the computing environment 1402 to support the implementation through the networking devices 1416 and the I/O devices 1414.

The embodiments disclosed herein may be implemented through at least one software program running on at least one hardware device and performing network management functions to control the elements. The elements shown in FIGS. 1 through 14 include blocks which may be at least one of a hardware device, or a combination of hardware devices and software units.

The foregoing description of embodiments of the present invention reveal the general nature of the present invention herein so that others may, by applying current knowledge, modify or adapt for various applications such specific embodiments without departing from the scope and spirit of the present invention, and, therefore, such adaptations and modifications are intended to be comprehended within the meaning and range of equivalents of the disclosed embodiments. It is to be understood that the terminology employed herein is for the purpose of description and not of limitation. Therefore, while embodiments of the present invention herein have been described, those skilled in the art will recognize that the embodiments herein may be practiced with modification within the spirit and scope of the present invention as defined by the appended claims and their equivalents.

What is claimed is:

1. A method for operating a user equipment (UE) in a wireless communication system, the method comprising:
    identifying a universal subscriber identity module (USIM) application of the UE that is configured with security credentials comprising an international mobile subscriber identity (IMSI) for an isolated evolved universal mobile telecommunications system terrestrial radio access network (E-UTRAN) operation for public safety (IOPS) operation and an access class for the IOPS operation; and
    performing an authentication procedure with an evolved node B (eNB) in an IOPS mode based on the IMSI for the IOPS operation and the access class for the IOPS operation,
    wherein the security credentials are a distinct set of security credentials for the IOPS operation separate from those used for a normal operation, and
    wherein the normal operation comprises a non-IOPS mode of operation which is based on a backhaul connection to an evolved packet core (EPC).

2. The method of claim 1, wherein the access class comprises an access class status 11 defined in a $3^{rd}$ generation partnership project (3GPP).

3. The method of claim 1, wherein the access class allows the UE to access the eNB while barring other non-IOPS-enabled UEs in a cell associated with the eNB.

4. The method of claim 1,
    wherein the eNB has no connectivity to a macro EPC while being connected with a local EPC.

5. The method of claim 1, further comprising:
    receiving, from the eNB, a public land mobile network (PLMN) identity for the IOPS operation; and
    activating the USIM application responsive to receiving the PLMN identity.

6. The method of claim 1, wherein the USIM application is dedicated exclusively for the IOPS operation and uses the distinct set of security credentials separate from those used for the normal operation.

7. The method of claim 1, wherein the distinct set of security credentials comprises at least one of:
    a permanent key K uniquely assigned for the IOPS operation;
    a public land mobile network (PLMN) identity assigned for an IOPS network operation;
    the IMSI uniquely assigned for the IOPS operation; and
    an access class status of 11 or 15, subject to regional/national regulatory requirements and an operator policy.

8. An apparatus of a user equipment (UE) in a wireless communication system, the apparatus comprising:
    a transceiver; and
    at least one processor configured to:
        identify a universal subscriber identity module (USIM) application of the UE that is configured with security credentials comprising an international mobile subscriber identity (IMSI) for an isolated evolved universal mobile telecommunications system terrestrial radio access network (E-UTRAN) operation for public safety (IOPS) operation and an access class for the IOPS operation; and
        perform an authentication procedure with an evolved node B (eNB) in an IOPS mode based on the IMSI for the IOPS operation and the access class for the IOPS operation,
    wherein the security credentials are a distinct set of security credentials for the IOPS operation separate from those used for a normal operation, and
    wherein the normal operation comprises a non-IOPS mode of operation which is based on a backhaul connection to an evolved packet core (EPC).

9. The apparatus of claim 8, wherein the access class comprises an access class status 11 defined in a $3^{rd}$ generation partnership project (3GPP).

10. The apparatus of claim 8, wherein the access class allows the UE to access the eNB while barring other non-IOPS-enabled UEs in a cell associated with the eNB.

11. The apparatus of claim 8, wherein the eNB is in an IOPS mode, and
    wherein the eNB has no connectivity to a macro EPC while being connected with a local EPC.

12. The apparatus of claim 8, wherein the transceiver is configured to receive, from the eNB, a public land mobile network (PLMN) identity for the IOPS operation, and
    wherein the at least one processor is configured to activate the USIM application responsive to receiving the PLMN identity.

13. The apparatus of claim 8, wherein the USIM application is dedicated exclusively for the IOPS operation and uses the distinct set of security credentials separate from those used for the normal operation.

14. The apparatus of claim 8, wherein the distinct set of security credentials comprises at least one of:
- a permanent key K uniquely assigned for the IOPS operation;
- a public land mobile network (PLMN) identity assigned for an IOPS network operation;
- the IMSI uniquely assigned for the IOPS operation; and
- an access class status of 11 or 15, subject to regional/national regulatory requirements and an operator policy.

15. An apparatus of an evolved node B (eNB) in a wireless communication system, the apparatus comprising:
- a transceiver; and
- at least one processor configured to authenticate a user equipment (UE) based on security credentials configured in a universal subscriber identity module (USIM) application of the UE,
- wherein the security credentials comprise an international mobile subscriber identity (IMSI) for an isolated evolved universal mobile telecommunications system terrestrial radio access network (E-UTRAN) operation for public safety (IOPS) operation and an access class for the IOPS operation,
- wherein the security credentials are a distinct set of security credentials for the IOPS operation separate from those used for a normal operation, and
- wherein the normal operation comprises a non-IOPS mode of operation which is based on a backhaul connection to an evolved packet core (EPC).

16. The apparatus of claim 15, wherein the access class comprises an access class status 11 defined in a $3^{rd}$ generation partnership project (3GPP).

17. The apparatus of claim 15, wherein the access class allows the UE to access the eNB while barring other non-IOPS-enabled UEs in a cell associated with the eNB.

18. The apparatus of claim 15, wherein the eNB is in an IOPS mode, and
- wherein the eNB has no connectivity to a macro EPC while being connected with a local EPC.

19. The apparatus of claim 15, wherein the USIM application is dedicated exclusively for the IOPS operation and uses the distinct set of security credentials separate from those used for the normal operation.

20. The apparatus of claim 15, wherein the distinct set of security credentials comprises at least one of:
- a permanent key K uniquely assigned for the IOPS operation;
- a public land mobile network (PLMN) identity assigned for an IOPS network operation;
- the IMSI uniquely assigned for the IOPS operation; or
- an access class status of 11 or 15, subject to regional/national regulatory requirements and an operator policy.

* * * * *